United States Patent
Ling et al.

(10) Patent No.: US 9,414,184 B2
(45) Date of Patent: *Aug. 9, 2016

(54) METHOD AND SYSTEM FOR BROADBAND NEAR-FIELD COMMUNICATION (BNC) UTILIZING FULL SPECTRUM CAPTURE (FSC) SUPPORTING BRIDGING ACROSS WALL

(71) Applicant: MAXLINEAR, INC., Carlsbad, CA (US)

(72) Inventors: Curtis Ling, Carlsbad, CA (US); Timothy Gallagher, Encinitas, CA (US)

(73) Assignee: MAXLINEAR INC., Carlsbad, CA (US)

( * ) Notice: Subject to any disclaimer, the term of this patent is extended or adjusted under 35 U.S.C. 154(b) by 140 days.

This patent is subject to a terminal disclaimer.

(21) Appl. No.: 13/726,965

(22) Filed: Dec. 26, 2012

(65) Prior Publication Data

US 2013/0210346 A1 Aug. 15, 2013

Related U.S. Application Data

(60) Provisional application No. 61/599,045, filed on Feb. 15, 2012, provisional application No. 61/605,001, filed on Feb. 29, 2012.

(51) Int. Cl.
*H04W 4/00* (2009.01)
*H04B 5/00* (2006.01)
*H04B 17/309* (2015.01)

(52) U.S. Cl.
CPC ............... *H04W 4/008* (2013.01); *H04B 5/00* (2013.01); *H04B 5/0037* (2013.01); *H04B 17/309* (2015.01)

(58) Field of Classification Search
USPC .......................................... 375/300; 320/108
See application file for complete search history.

(56) References Cited

U.S. PATENT DOCUMENTS 5,533,023 A 7/1996 Ohlson et al.
7,167,528 B2 1/2007 Chen et al.
(Continued)

OTHER PUBLICATIONS

Lai "Low-profile broadband RFID tag antennas mountable on metallic objects", Antennas and Propagation Society International Symposium (APSURSI), 2010 IEEE, pp. 1-4, Jul. 11-17, 2010.
(Continued)

*Primary Examiner* — Junpeng Chen
(74) *Attorney, Agent, or Firm* — McAndrews, Held & Malloy Ltd.

(57) ABSTRACT

A communication system may include a first broadband wireless device and a second broadband wireless device. Signals may be wirelessly communicated from the first broadband wireless device to the second broadband wireless device at a power level that is below a spurious emissions mask. The communicated signals may be transmitted over a designated frequency band. A barrier separates the first broadband wireless device from the second broadband wireless device. The first broadband wireless device may be paired with the second broadband wireless device. Usable channels may be detected within a frequency spectrum band designated for use by the first and the second broadband wireless device. The signals may be wirelessly communicated from the first to the second broadband wireless device via one or more of the detected usable channels. Two or more of the plurality of the detected usable channels may be aggregated and utilized for the communication.

23 Claims, 15 Drawing Sheets

(56) References Cited

U.S. PATENT DOCUMENTS

| | | |
|---|---|---|
| 8,654,262 B2 | 2/2014 | Du Val et al. |
| 8,725,113 B2 | 5/2014 | Gargi et al. |
| 2001/0034475 A1 | 10/2001 | Flach et al. |
| 2002/0042290 A1 | 4/2002 | Williams et al. |
| 2003/0220765 A1 | 11/2003 | Overy et al. |
| 2006/0083187 A1 | 4/2006 | Dekel |
| 2007/0019959 A1 | 1/2007 | Retnasothie et al. |
| 2007/0258542 A1 | 11/2007 | Cleveland |
| 2008/0004904 A1 | 1/2008 | Tran |
| 2009/0196180 A1 | 8/2009 | Bahl et al. |
| 2010/0317332 A1 | 12/2010 | Bathiche et al. |
| 2011/0313922 A1 | 12/2011 | Ben Ayed |
| 2011/0319119 A1* | 12/2011 | Ishii ............................. 455/522 |
| 2012/0057655 A1* | 3/2012 | Marsili et al. ................. 375/300 |
| 2012/0182887 A1 | 7/2012 | Junell et al. |
| 2013/0038278 A1* | 2/2013 | Park et al. ..................... 320/108 |
| 2013/0210345 A1 | 8/2013 | Ling et al. |
| 2013/0210347 A1 | 8/2013 | Ling et al. |
| 2013/0210352 A1 | 8/2013 | Ling et al. |
| 2013/0210353 A1 | 8/2013 | Ling et al. |

OTHER PUBLICATIONS

Int'l Search Report and Written Opinion for PCT/US2013/026367 dated Apr. 30, 2013 (11 pages).

* cited by examiner

METHOD AND SYSTEM FOR BROADBAND NEAR-FIELD COMMUNICATION (BNC) UTILIZING FULL SPECTRUM CAPTURE (FSC) SUPPORTING BRIDGING ACROSS WALL

CROSS-REFERENCE TO RELATED APPLICATIONS/INCORPORATION BY REFERENCE

This patent application makes reference to, claims priority to, and claims benefit from U.S. Provisional Application Ser. No. 61/599,045, which was filed on Feb. 15, 2012.

This patent application also makes reference to, claims priority to, and claims benefit from U.S. Provisional Application Ser. No. 61/605,001, which was filed on Feb. 29, 2012.

This application also makes reference to:

U.S. application Ser. No. 13/687,676, entitled "method and system for monitoring, management and maintenance of an Internet protocol LNB," which was filed on Nov. 28, 2012;

U.S. application Ser. No. 13/723,897, which is filed on Dec. 21, 2012; and

U.S. application Ser. No. 13/726,994, which is filed on even date herewith.

Each of the above reference applications is hereby incorporated herein by reference in its entirety.

FIELD OF THE INVENTION

Certain embodiments of the invention relate to communication systems. More specifically, certain embodiments of the invention relate to a method and system for broadband near-field communication (BNC) Utilizing full spectrum capture (FSC) supporting bridging across wall.

BACKGROUND OF THE INVENTION

Near-Field Communication (NFC) is a new short-range, standards-based wireless connectivity technology that uses magnetic field induction to enable communication between electronic devices in close proximity. Based on radio frequency identification (RFID) technologies, NFC provides a medium for the identification protocols that validate secure data transfer. NFC enables users to perform intuitive, safe, contactless transactions, access digital content and connect electronic devices simply by touching or bringing devices into close proximity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for broadband near-field communication (BNC) Utilizing full spectrum capture (FSC) supporting bridging across walls, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
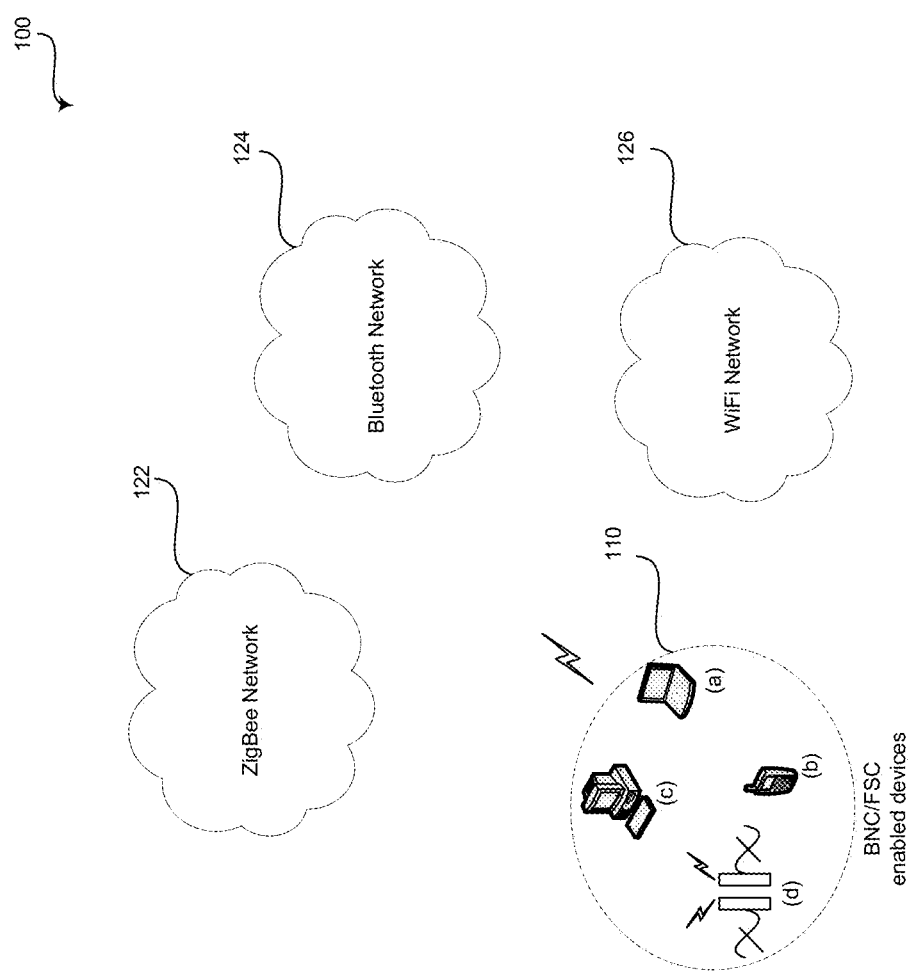
FIG. 1 is a diagram that illustrates an exemplary communication system, such as a Broadband Near-Field Communication (BNC) system that utilizes full spectrum capture (FSC), in accordance with an exemplary embodiment of the invention.

Certain embodiments of the invention may be found in a method and system for broadband near-field communication (BNC) Utilizing full spectrum capture (FSC) supporting bridging across walls. In accordance with various embodiments of the invention, a communication system may comprise a first broadband wireless device and a second broadband wireless device. Signals may be wirelessly communicated from the first broadband wireless device to the second broadband wireless device at a power level that is below a spurious emissions mask. The communicated signals may be transmitted over a designated frequency band. A barrier separates the first broadband wireless device from the second broadband wireless device. The signals may be wirelessly transmitted and/or received via one or more antennas that are utilized by the first broadband wireless device and the second broadband wireless device for wireless power transfer via their corresponding wireless power modules. The first broadband wireless device may be paired with the second broadband wireless device. Usable channels may be detected within a frequency spectrum band designated for use by the first and the second broadband wireless device. The signals may be wirelessly communicated from the first broadband wireless device to the second broadband wireless device via one or more of the detected usable channels. Two or more of the plurality of the detected usable channels may be aggregated and the signals may be wirelessly communicated from the first to the second broadband wireless device via at least a portion of the aggregated plurality of the detected usable channels. The wireless communication of the signals may utilize at least a portion of the aggregated plurality of the detected usable channels. The second broadband wireless device may be powered by an auxiliary power source when the first broadband wireless device is fully powered up and the second broadband wireless device is operating in a low power mode.

The first broadband wireless device may be aligned with said second broadband wireless device when the first broadband wireless device and the second broadband wireless device are on opposite sides of said barrier. One or more signals and/or one or more signal quality indicators may be utilized to enable the aligning of the first broadband wireless device with the second broadband wireless device. One or both of the first broadband wireless device and the second broadband wireless device are operable to generate the one or more signals and/or said one or more signal quality indicators. The one or more signals may comprise test signals, preambles and pilot tones. The one or more signal quality indicators may comprises error rates, signal to noise ratio, signal to interference plus noise ratio, carrier to noise ratio, carrier to interference noise ratio, error vector magnitude, and signal strength indicator. Visual and/or audio cues may be generated by one or both of the first broadband wireless device and the second broadband wireless device to aid with the aligning. In one embodiment of the invention, the first broadband wireless device may comprise a first broadband wireless dongle and the second broadband wireless device may comprise a second broadband wireless dongle.

FIG. 1 is a diagram that illustrates an exemplary Broadband Near-Field Communication (BNC) system that utilizes full spectrum capture (FSC), in accordance with an exemplary embodiment of the invention. Referring to FIG. 1, there is shown a communication system 100 comprising a plurality of devices 110(*a*) through 110(*d*), and associated communication networks 122 through 126. The communication system 100 may be, for example, a BNC system and the devices 110(*a*) through 110(*d*) may be, for example, BNC/FSC enabled.

A BNC/FSC enabled device such as the BNC/FSC enabled device 110(*a*) may comprise suitable logic, circuitry, code, and/or interfaces that may be operable to perform Broadband Near-Field Communication (BNC) with other BNC/FSC enabled devices. In this regard, the BNC/FSC enabled device 110(*a*) may exchange or communicate various types of information such as, for example, telephone numbers, pictures, multimedia content and files such as MP3 files, and/or digital authorizations with other BNC/FSC enabled devices such as the BNC/FSC enabled devices 110(*b*) and 110(*c*). In one exemplary embodiment of the invention, the BNC/FSC dongle 110(*d*) may enable wireless communication across a barrier such as a dwelling wall.

For data transmission with BNC, a BNC enabled device that initiates the data transmission refers to a polling device (initiator), while a BNC enabled device that is targeted by the polling device refers to a listening device. A BNC enabled device such as the BNC/FSC enabled device 110(*a*) may operate in a reader/writer mode (active mode), a card emulation mode (passive mode), or a peer-to-peer mode. In active mode, the BNC/FSC enabled device 110(*a*) is active and reads or writes to a passive legacy RFID tag. In passive mode, the BNC/FSC enabled device 110(*a*) behaves like an existing contactless card conforming to one of the legacy standards. In peer-to-peer mode, the BNC/FSC enabled device 110(*a*) and its peer BNC enabled device such as the BNC/FSC enabled device 110(*b*) may exchange or communicate information. In this regard, the initiator device (polling device) may require less power compared to the reader/writer mode. Depending on device capacities, the BNC/FSC enabled devices 110(*a*)-110(*d*) may coexist with or support other wireless technologies such as, for example, ZigBee, Bluetooth, WLAN, and WiMax. In this regard, the BNC/FSC enabled devices 110(*b*) and 110(*c*) may operate in various spectrum bands. For example, with Zigbee enabled, the BNC/FSC enabled devices 110(*a*)-110(*c*) may operate in 868 MHz, 915 MHz or 2.4 GHz frequency bands. With Bluetooth enabled, the BNC/FSC enabled devices 110(*b*), 110(*c*) and 110(*d*) may operate within the 2.4 GHz band. With WLAN enabled, the BNC/FSC enabled devices 110(*b*), 110(*c*) and 110(*d*) may operate within the 2.4, 3.6 and 5 GHz frequency bands. With fixed WiMAX enabled, the BNC/FSC enabled devices 110(*b*), 110(*c*) and 110(*d*) may operate in the 2.5 GHz and 3.5 GHz frequency bands, which require a license, as well as the license-free 5.8 GHz band. With mobile WiMAX enabled, the BNC/FSC enabled devices 110(*b*), 110(*c*) and 110(*d*) may operate in the 2.3-2.4 GHz, 2.5-2.7 GHz, 3.3-3.4 GHz and 3.4-3.8 GHz frequency bands.

In an exemplary embodiment of the invention, the BNC/FSC enabled device 110(*a*) may be operable to utilize full-spectrum capture (FSC) technology to meet the challenging demands of operators, consumers, and hardware vendors while providing efficient scalability for future development. In this regard, the BNC/FSC enabled device 110(*a*) may be operable to digitize all, or substantially all, of the spectrum covered by the protocol(s) of interest, such that all, or substantially all, channels of the protocol(s) are concurrently digitized and available for further processing The BNC/FSC enabled device 110(*a*) may utilize BNC together with full spectrum capture to provide BNC/FSC hybrid solutions for proliferating data or content delivery and services throughout the home and to connected devices such as the BNC/FSC enabled devices 110(*b*), 110(*c*) and 110(*d*). Aspects of full spectrum capture may be found in U.S. application Ser. No.

13/485,003 filed May 31, 2012, U.S. application Ser. No. 13/336,451 filed on Dec. 23, 2011 and U.S. Application 61/532,098 filed Sep. 7, 2011. Each of these applications is hereby incorporated herein by reference in its entirety. In accordance with an exemplary embodiment of the invention, the BNC/FSC dongle 110(d) may provide wireless bridging across a barrier such as walls or other obstructions within a building.

The ZigBee network 122 may comprise suitable logic, circuitry, code, and/or interfaces that may be operable to provide data services to various ZigBee-based devices such as the BNC/FSC enabled devices 110(a), 110(c) and 110(d) using ZigBee technology. ZigBee is a standard that defines a set of communication protocols on top of the IEEE 802.15.4 Radio Protocol for low-data-rate short-range wireless networking. For example, the ZigBee network 122 may incorporate ZigBee radios to operate at 1 mW RF power and to go to sleep when not involved in transmission so as to minimize power consumption and promote long battery life in battery-powered devices.

The Bluetooth network 124 may comprise suitable logic, circuitry, interfaces and/or code that may be operable to provide data services to various Bluetooth-based mobile devices such as the BNC/FSC enabled devices 110a, 110(b), 110(c) and/or 110(d) using Bluetooth technology. A Bluetooth-based mobile device such as the BNC/FSC enabled device 110a may be operable to communicate Bluetooth radio frequency signals with peer Bluetooth devices such as the BNC/FSC enabled devices 110(b), 110(c) and 110(d) for various data services such as SMS/MMS and mobile TV.

The WiFi network 126 may comprise suitable logic, devices, interfaces and/or code that may be operable to provide data services to various mobile devices such as the BNC/FSC enabled devices 110(a), 110(c) and 110(d) by using WiFi technology. A WiFi-based mobile device such as the BNC/FSC enabled device 110a may be operable to communicate WiFi radio frequency signals with peer WiFi devices such as the BNC/FSC enabled devices 110(b), 110(c) and 110(d) for various data services such as SMS/MMS and mobile TV.

In operation, the BNC/FSC devices 110(a), 110(c), and 110(d) may provide BNC/FSC hybrid solutions for signal or data transmission at power densities through associated communication networks such as the Bluetooth network 124. To support the data transmission with BNC, the BNC/FSC enabled devices 110(a), 110(c) and 110(d) may be configured to utilize full spectrum capture in order to detect usable channels and aggregate the usable channels to increase channel bandwidth for the data transmission. In one exemplary embodiment of the invention, for transmission, the data transmission may be carried or transmitted over a single channel within the operating spectrum band. However, for reception, multiple reference elements or signals such as pilot signals may be utilized to determine or detect which of channels in the operating spectrum band may be indeed usable.

Figure 2A:
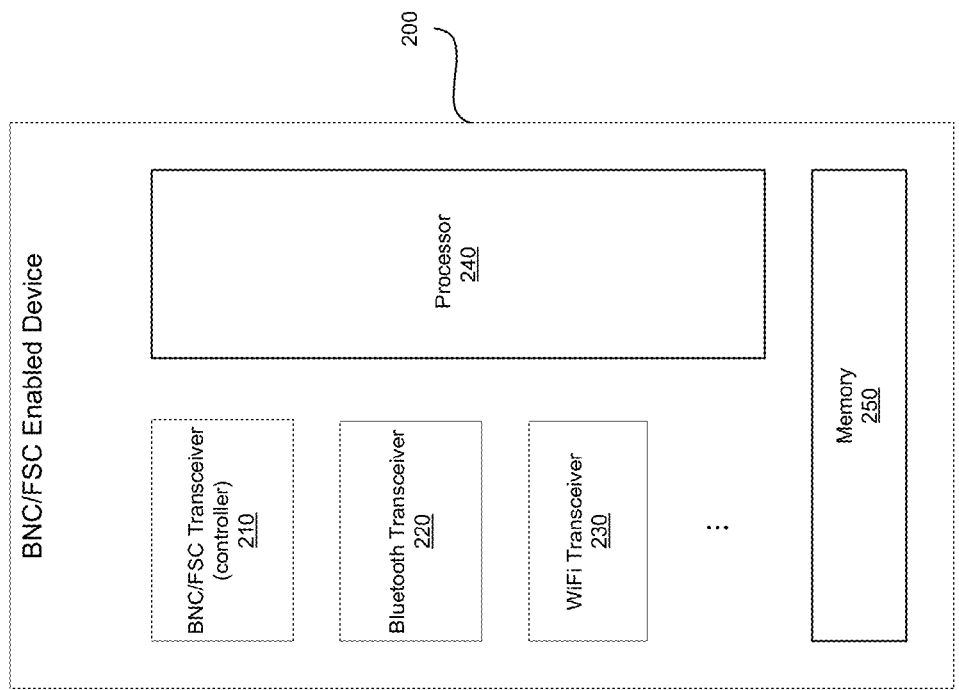
FIG. 2A is a block diagram that illustrates an exemplary device that performs, for example, Broadband Near-Field Communication (BNC) utilizing full spectrum capture (FSC), in accordance with an exemplary embodiment of the invention.
Figure 2B:
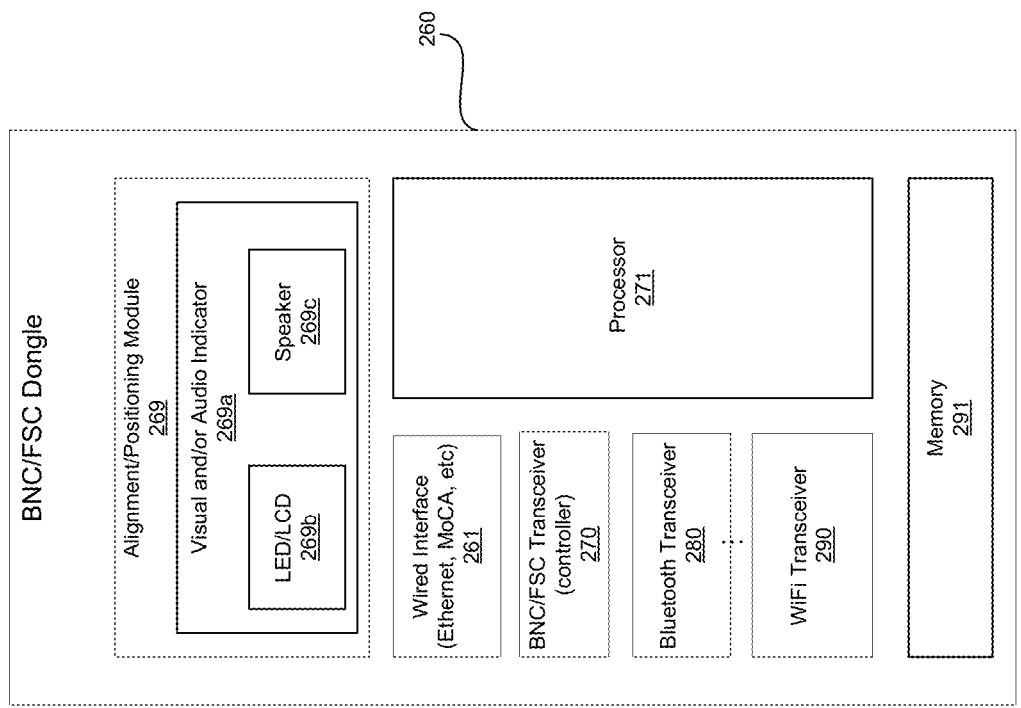
FIG. 2B is a block diagram that illustrates an exemplary Communication utilizing a full spectrum capture dongle, in accordance with an exemplary embodiment of the invention.

FIG. 2A is a block diagram that illustrates an exemplary device that performs, for example, Broadband Near-Field Communication (BNC) utilizing full spectrum capture (FSC), in accordance with an exemplary embodiment of the invention. Referring to FIG. 2A, there is shown a device 200 comprising a transceiver 210, a Bluetooth transceiver 220, a WiFi transceiver 230, a processor 240, and a memory 250. The Bluetooth transceiver 220 and the WiFi transceiver 230 may be optional depending on device capabilities, network availabilities and/or user preferences. In accordance with an exemplary embodiment of the invention, device 200 may comprise a BNC/FSC dongle and the transceiver may be a BNC/FSC transceiver 210. FIG. 2B illustrates an exemplary dongle.

The BNC/FSC transceiver 210 may comprise suitable logic, circuitry, interfaces and/or code that may allow the BNC/FSC enabled device 200 and other BNC capable devices to perform communication according to an BNC protocol. The BNC/FSC transceiver 210 may operate in a reader/writer mode (active mode), a card emulation mode (passive mode), or a peer-to-peer mode. In active mode, the BNC/FSC transceiver 210 may act like contactless cards. In this regard, the BNC/FSC transceiver 210 may enable the BNC/FSC enabled device 200 being used for payment. In passive mode, the BNC/FSC transceiver 210 may enable interacting with RF tags. For example, the BNC/FSC transceiver 210 may enable the BNC/FSC enabled device 200 used to read 'Smart Posters' (writer RF tags) to see whatever information has been included. In peer-to-peer mode, the BNC/FSC transceiver 210 may be operable to communicate with another BNC capable devices. For example, the BNC/FSC transceiver 210 may enable the BNC/FSC enabled device 200 to communicate information with other BNC/FSC enabled devices 110(a)-110(c). In an exemplary embodiment of the invention, the BNC/FSC transceiver 210 may utilize a dedicated RF front-end circuitry for data transmission and receiving using BNC. In another exemplary embodiment of the invention, the BNC/FSC transceiver 210 may share a RF front-end circuitry with other technology-based transceivers such as the Bluetooth transceiver 220 and the WiFi transceiver 230. In yet another exemplary embodiment of the invention, the BNC/FSC transceiver 210 may be configured to communicate signals or data in BNC utilizing full spectrum capture. In this regard, the BNC/FSC transceiver 210 may be allowed to capture or utilize the entire spectrum band for data or signal transmission and receiving. For transmission, the BNC/FSC transceiver 210 may be instructed or signaled to utilize a single channel within the spectrum band. For reception, the BNC 210 may be configured to utilize one or more channels within the entire spectrum band.

The Bluetooth transceiver 220 may comprise suitable logic, circuitry, interfaces and/or code that may be operable to communicate Bluetooth radio signals over the Bluetooth network 124. In an exemplary embodiment of the invention, the Bluetooth transceiver 220 may be on continuously when needed and may utilize more power than full spectrum capture. The Bluetooth transceiver 220 may be enabled to support coexistence operations so as to receive Bluetooth signals while utilizing full spectrum capture in the BNC/FSC enabled device 200. In an exemplary embodiment of the invention, the Bluetooth transceiver 220 may utilize a dedicated RF front-end circuitry for data transmission and receiving using Bluetooth. In another exemplary embodiment of the invention, the Bluetooth transceiver 220 may share a RF front-end circuitry with the BNC/FSC transceiver 210 for data transmission and receiving using Bluetooth. In an exemplary embodiment of the invention, in some instances, the Bluetooth transceiver 220 may be securely paired with other Bluetooth and BNC capable devices utilizing BNC. In this regard, the BNC/FSC transceiver 210 may be enabled to exchange authentication information over an BNC link for pairing the Bluetooth transceiver 220 with other Bluetooth and BNC capable devices.

The WiFi transceiver 230 may comprise suitable logic, circuitry, interfaces and/or code that may be operable to communicate WiFi radio signals over the WiFi network 126. In an exemplary embodiment of the invention, the WiFi transceiver 230 may be on continuously when needed and may utilize more power than full spectrum capture. The WiFi transceiver 230 may be enabled to support coexistence operations so as to receive WiFi signals while utilizing full spectrum capture in the BNC/FSC enabled device 200. In an exemplary embodiment of the invention, the WiFi transceiver 230 may utilize a dedicated RF front-end circuitry for data transmission and reception using WiFi. In another exemplary embodiment of the invention, the WiFi transceiver 230 may share a RF front-end circuitry with the BNC/FSC transceiver 210 for data transmission and receiving using WiFi.

The processor 240 may comprise suitable logic, circuitry, interfaces and/or code that may be enabled to perform a variety of signal processing tasks such as channel selection or filtering, digital scaling, rate conversion, carrier/time synchronization/recovery, equalization/demapping, and/or channel decoding. The processor 240 may support various modem operations such as OFDM and CDMA operations. The processor 240 may be operable to coordinate and control operations of the BNC/FSC transceiver 210, the Bluetooth transceiver 220, and the WiFi transceiver 230 to communicate corresponding radio signals while utilizing full spectrum capture. For example, the processor 240 may manage, activate or deactivate the BNC/FSC transceiver 210 according to received Bluetooth signals via the Bluetooth transceiver 220. The processor 240 may also be operable to synchronize the operation of the BNC/FSC transceiver 210 and the Bluetooth transceiver 220, for example, so as to reduce time delay for accurately determining the location of an object of interest. In an exemplary embodiment of the invention, the processor 240 may be operable to manage data transmission as well as data reception. For transmission, the processor 240 may be operable to select or utilize a single channel within the operation spectrum band for data transmission. For reception, the processor 240 may be operable to utilize multiple reference elements or signals such as pilot signals to determine or detect which of the channels in the operation spectrum band may be indeed usable. The processor 240 may also be operable to aggregate the usable channels to increase channel bandwidth for the data transmission.

In various exemplary embodiments of the invention, the processor 240 may enable configuration of the BNC/FSC enabled device 200 to operate in different communication environments. In this regard, for example, power, distance and bandwidth may be configured in order to stay within the FCC masks and limits and at the same time, provide optimal performance across the entire bandwidth.

For FCC requirements, power may be measured in a 120 KHz spectrum bandwidth. To determine how much power could be transmitted, the bandwidth available has to be determined. Once the bandwidth is determined, that value may be divided by 120 KHz and the results multiplied by the power that may be transmitted. For example, within the broadcast television frequency band, spurious radiation within a 120 kHz bandwidth must result in a field strength of 200 microvolts per meter or less, measured at a distance of 3 meters from an isotropic radiator. This field strength equates to a transmitted power of 0.01 microwatts (−50 dBm) of power radiating isotropically. If a bandwidth much larger than 120 kHz is utilized, the FCC requirements imply that much more power may be transmitted without transgressing limits on spurious emissions. For example, if a devices transmits its power over a 100 MHz bandwidth, then dividing this 100 MHz bandwidth by the measurement bandwidth of 120 KHz results in a 29 dB increase in allowable spurious emission levels. In order to stay well within the FCC limitations for spurious emissions, a device may be designed to transmit −50 dBm spread over a full gigahertz (GHz) of bandwidth, which is 39 dB below the FCC spurious radiation power spectral density limitations. With such a conservative estimate, the FCC may not possibly complain and consumer product manufacturers may have no issues or have any questions about whether the product may pass the FCC regulation.

Although −50 dBm may seem like very little power, using full spectrum capture may enable a wealth of applications. At this power level, several bits per second per hertz may be reliably conveyed across a distance of about 10 cm, equating to several gigabits per second of capacity if the entire television spectrum up to 1 GHz is employed. If the −50 dBm transmitted power is spread over a subset of the television spectrum (e.g. 200 to 600 MHz), there is a low likelihood of interference with any device 3 meters or farther away.

When broadband near-field communication is employed at a distance less than a wavelength, then attenuation improves nonlinearly as distance decreases linearly.

The processor 240 may establish a high data rate communication link utilizing BNC which transmits power levels 30 dB or more below spurious emission levels permitted by FCC, while maintaining a link budget with sufficient margin to address a variety of use cases, trading off data rate for transmission distance or barrier penetrating capabilities. One method of implementing this tradeoff is to use spread spectrum techniques to achieve spreading gain in exchange for throughput, such as is employed in CDMA systems. With a 30 dB margin, signals may, for example, be communicated through a typical non-load-bearing concrete wall.

In an exemplary embodiment of the invention, the processor 240 may enable the use of a channel or spectrum map to dynamically track in real-time, what frequencies in the channel band are usable. For example, the environment may be sensed and a channel map may be generated to identify TV, Bluetooth, WiMax, and 802.11 channels and the status of the identified channels noted. The channels that are not currently usable, for example above a certain noise threshold, will be avoided. The channel map is dynamically updated. In an exemplary embodiment of the invention, a broadband OFDM receiver may be utilized to capture the entire band and selectively begin to transmit on those channels that are deemed suitable (e.g., based on the channel map) for transmission. Since the two devices (Tx and Rx) are relatively close to each other, it may be safe to assume that both devices (Tx and Rx) are experiencing similar RF related conditions. In this regard, the transmitter may transmit without coordination of frequencies between the two devices. In one exemplary embodiment of the invention, a pool of backup channels may be maintained and as soon as a current channel degrades, a switch may be made to utilize the backup channels. Channels may be allocated from the pool of backup channels and de-allocated and placed back in the pool as needed. In an exemplary embodiment of the invention, in instances where the BNC/FSC enabled device 200 may coexist with an 802.11 device, the BNC/FSC enabled device 200 may be operable to sense the channel and transmit only on channels that are determined to be clear. The channel map may be continuously updated to ensure that the status of each of the channels is up-to-date. A weighting may also be applied to the channel.

In one exemplary embodiment of the invention, a plurality of users, each with their own spreading code, may concurrently transmit over a large bandwidth without any blocking. A receiver may capture the entire bandwidth and based on security settings, may select and listen to only those authorized user signals that may be of interest.

In one exemplary embodiment of the invention, the processor 240 may enable broadcast feature based distance. For example, the characteristics of a room such as the size and openness may be sensed and the power, data rate, and range for the BNC/FSC enabled device 200 may be adjusted to conform with the sensed characteristics. The BNC/FSC enabled device 200 may be configured to communicate based on some threshold distance that is sensed. In some instances, it may be desirable for all conference participants in a conference room to receive information for a presentation. In this regard, the presenter does not care who receives a broadcast signal of the presentation so long as they are within a certain range, in this case, in the room. For example, all the conference participants may be within a perimeter of 15 feet. The broadcast is therefore controlled so that the content for the presentation is broadcasted to the conference participants within the conference room. In addition, beamforming and MIMO may be employed to determine the characteristics and to optimize communication amongst the devices.

In one exemplary embodiment of the invention, the processor 240 may provide or enable security by turning down the transmit power of the BNC/FSC enabled device 200 in order to minimize eavesdropping. In such instances, the containment of the power enables only devices within a certain range to receive signals and devices that are outside that range will not be able to receive signals. A lookup table (LUT), for example, comprising power and distance or range data may be utilized by the processor 240 or other device within the BNC/FSC enabled device 200 to control this security feature.

In another exemplary embodiment of the invention, the processor 240 may provide or enable security by ensuring that the processing time is less than the round trip delay in order to prevent spoofing. In this regard, the processor 240 or other device within the BNC/FSC enabled device 200 may be operable to determine the round trip delay. If the determined round trip delay is less than or equal to a certain value or threshold, communication may be permitted. However, in instances where the round trip delay may be greater than a particular value or threshold, communication may be blocked since this may be an indication that spoofing may have occurred.

In an exemplary embodiment of the invention, a conference presenter may walk into a conference room and provide information such as the size of the room and the number of participants. This information may be utilized by the processor 240 to control the power and range that may be utilized to configure the BNC/FSC transceiver for use during the conference or other group presentations. In this manner, device screens and files, for example, may be shared amongst conference or group participant devices.

In another aspect of the invention, a map of conference attendees in the room may be presented and the conference may manually authorize each attendee to receive BNC/FSC presented information.

In various exemplary embodiments of the invention, the processor 240 may enable sharing of a screen for a cell phone or other communication device with other people in a room. While applications such as WebEx are tied to the Web, various exemplary embodiments of the instant invention comprise ad-hoc sharing of content, and control and manipulation of content displayed on a screen. In this regard, there is no need for a sophisticated backend server to facilitate the Web sharing service.

In an exemplary embodiment of the invention, a conference presenter may utilize BNC/FSC to share the information displayed on their tablet or cell phone screen with all team members in a conference room, either directly or in a daisy-chain manner. In this regard, the content displayed on the presenter's desktop on the cell phone or a tablet will be displayed on the screens of team members in an ad-hoc manner.

In an exemplary embodiment of the invention, a user may decide to take a picture and instead of showing it to a friend and emailing or texting the picture to that friend, the user may decide to share the screen that displays the picture content. Unlike Webex or other screen sharing methods, the processor 240 may enable sharing of the screens on a smartphone or tablet without using the 3G network or Internet. Additionally, no wires need to be connected for sharing of content among devices.

In an exemplary embodiment of the invention, the processor 240 may manage content for the BNC/FSC enabled device 200 such that the content may be layered and when a user is within certain proximity of another BNC/FSC device, the display may be shared without the need for any security. Both devices may concurrently display the same content. A profile may be utilized to determine what is to be shared and with whom it should be shared and when. A profile may also indicate other criteria such as time of day and location where sharing of the screen is permissible. Once the profile or some default settings are established, then the sharing of the display may occur automatically without user intervention.

Since the BNC/FSC enabled device 200 may be a Location Aware and Context Aware device, the processor 240 may be configured to determine whether the environment is a friendly one and if so, no security may be utilized. On the other hand, if it determined that the environment is unfriendly, then security may be required before screens are shared. If the user is with family or friends, then the screen may be shared without security with devices that are within a certain range. For devices outside of that range, then security is required to share the screen. A secure sharing session may be initiated with any device with the proper security keys (public keys and private keys) or procedures in place. A user may initiate sharing of their screen with all devices within 10 feet without security. This may occur since there is enough bandwidth to resolve the distance to within a foot or less. The distance may be extended if the user thinks that only trusted devices will be within that extended range. In some instances, the user may only allow a certain number of devices to share the screen. Once that number is reached, then no more connections or sharing sessions are permitted. If another device attempts to view the displayed screen, then that attempt is denied. This may be referred to as proximity sharing. With proximity sharing, the processor 240 may or may not place restriction on whether the screen or file may be copied and/or edited. For example, in instances where a file of a memo is being shared, group editing may be enabled for some or all the members in the group. Members in the group may be given control of the document at different times to enable editing. This may also be utilized on a social environment. For example, one user may draw on their device screen and the drawing on that screen is shared among friends in the room. The friends may interact with the drawing and may edit the document so it becomes a conversational piece.

In addition to sharing screens, videos, presentations, the processor 240 may allow that files may also be shared in an ad-hoc manner without the need to use the WWAN cellular network or a WiFi network, thereby eliminating the need to utilize and cause congestion on these networks. The cellular service providers may embrace this since it may offload traffic from their networks. This autonomous sharing requires no configuration on the part of the users.

The memory 250 may comprise suitable logic, circuitry, interfaces and/or code that may enable storage of data and/or other information utilized by the processor 240. For example, the memory 250 may be utilized to store information such as available operation spectrum bands that the BNC/FSC enabled device 200 may operate, and channels in the available operation spectrum bands. The memory 250 may be enabled to store executable instructions to manage or configure the BNC/FSC transceiver 210, the Bluetooth transceiver 220, and/or the WiFi transceiver 230 for desired behavior. The memory 250 may comprise RAM, ROM, low latency non-volatile memory such as flash memory and/or other suitable electronic data storage capable of storing data and instructions.

In operation, the processor 240 may manage and control operation of device components such as the BNC/FSC transceiver 210 and the Bluetooth transceiver 220 to communicate corresponding radio signals for applications of interest. Transceivers such as the BNC/FSC transceiver 210 may be enabled to utilize full spectrum capture for data communication to support the applications of interest. For example, a transceiver such as the BNC/FSC transceiver 210 may be enabled to digitize the entire operation spectrum band, 1 GHz, for example, for instant access to channels anywhere in the operation spectrum band. In this regard, the use of full spectrum capture may enable the BNC/FSC transceiver 210 with total bandwidth deployment flexibility. For example, transceivers such as the BNC/FSC transceiver 210 may be tuned to an entirely different frequency in the operation spectrum band without constraint. In particular, previously unusable frequencies in the operation spectrum band may now be applied for additional broadband services. Additionally, the BNC/FSC transceiver 210 may be tuned to either broadband or broadcast services, and the channel allocation may be changed over time allowing operators to seamlessly transition services from broadcast to IP.

FIG. 2B is a block diagram that illustrates an exemplary device that performs Communication utilizing a full spectrum capture dongle, in accordance with an exemplary embodiment of the invention. In accordance with an exemplary embodiment, the dongle shown is a BNC/FSC dongle. Referring to FIG. 2B, there is shown a BNC/FSC dongle 260 comprising an alignment/positioning module 269, a BNC/FSC transceiver (controller) 270, a wired interface 261, a Bluetooth transceiver 280, a WiFi transceiver 290, a processor 271, and a memory 291. The alignment/positioning module 269 may comprise a visual and/or audio indicator module 269(a). The Bluetooth transceiver 280, wired interface 261, and the WiFi transceiver 290 may be optional depending on device capabilities, network availabilities and/or user preferences.

The BNC/FSC transceiver (controller) 270 may comprise suitable logic, circuitry, interfaces and/or code that may allow the BNC/FSC dongle 260 and other BNC capable devices such as the BNC/FSC enabled device 200 to perform communication utilizing BNC/FSC. The BNC/FSC transceiver 270 may be substantially similar to the BNC/FSC transceiver (controller) 210, which is described with respect to FIG. 2A. For example, the BNC/FSC transceiver 270 may enable the BNC/FSC dongle 260 to communicate information with the BNC/FSC enabled device 200 and other BNC/FSC enabled devices 110(a)-110(c).

The alignment/positioning module 269 may comprise suitable logic circuitry interfaces and/or code that may be operable to provide optimal alignment of the BNC/FSC dongle when the dongle is utilized for bridging across a barrier such as a dwelling wall. In this regard, a first portion of the BNC/FSC dongle may be operable to transmit test signals that are received by the second portion of the BNC/FSC dongle and a quality and strength of the signals that are received may be determined. LEDs, LCD, beeps, audio or other alert may be utilized to provide alignment cues and to indicate when both portions of the BNC/FSC dongle are optimally aligned. The test signals may be transmitted by one or both portions of the BNC/FSC dongle and received and assessed by one or both portions of the BNC/FSC dongle in order to determine when the corresponding BNC/FSC dongle is aligned to provide optimal communication between both portions of BNC/FSC dongle.

The alignment/positioning module 269 may comprise suitable logic, circuitry, interfaces and/or code that may be operable to aid with alignment of the BNC/FSC dongle so as to ensure optimal communication between two paired BNC/FSC dongles. The alignment/positioning module 269 may comprise a visual and/or audio indicator module 269a that may be operable to provide visual and/or audio cues that may aid in the alignment of both portions of the BNC/FSC dongle. The visual and/or audio indicator module 269a may comprise LED(s)/LCD(s) 269b and/or a speaker 269c that may be operable to generate voice, beeps, audio, text lights or other indicators, which may function as alignment cues. The alignment/positioning module 269 may be controlled by the processor 271.

The wired interface 261 may comprise suitable logic, circuitry, interfaces and/or code that may be operable to provide wired communication. For example, the wired interface may comprise an Ethernet or MoCA interface that enables the BNC/FSC dongle 260 to communicate via wires. In this regard, in instances where a paired BNC/FSC dongle may be affixed to a barrier such as a concrete wall, a first portion of the BNC/FSC dongle may be coupled to, for example, a router via an Ethernet connection and a second portion of the BNC/FSC dongle may be coupled to a PC via an Ethernet connection. Accordingly, the BNC/FSC dongle 260 may be operable to provide BNC/FSC bridging across the wall and the remaining connectivity may utilize a wired connection.

The Bluetooth transceiver 280 may comprise suitable logic, circuitry, interfaces and/or code that may be operable to communicate Bluetooth radio signals over the Bluetooth network 124. The Bluetooth transceiver 280 may be substantially similar to the Bluetooth transceiver 220, which is described with respect to FIG. 2A. In an exemplary embodiment of the invention, in some instances, the Bluetooth transceiver 280 may be securely paired with other Bluetooth and BNC/FSC capable devices utilizing BNC such as the BNC/FSC enabled device 200 and the BNC/FSC dongle 260. In this regard, the BNC/FSC transceiver 270 may be operable to exchange authentication information over a BNC link for pairing the Bluetooth transceiver 280 with other Bluetooth and BNC/FSC capable devices.

In accordance with an exemplary embodiment of the invention, in instances where a paired BNC/FSC dongle may be affixed to a barrier such as a concrete wall, a first portion of the BNC/FSC dongle may be coupled to, for example, a router via a first Bluetooth connection and a second portion of the BNC/FSC dongle may be coupled to a PC via second Bluetooth connection. Accordingly, the BNC/FSC dongle 260 may be operable to provide BNC/FSC bridging across the wall and the remaining connectivity may utilize a Bluetooth connection.

The WiFi transceiver 290 may comprise suitable logic, circuitry, interfaces and/or code that may be operable to communicate WiFi radio signals over the WiFi network 126. The WiFi transceiver 290 may be substantially similar to the WiFi transceiver 230, which is illustrated in FIG. 2A. The WiFi transceiver 290 may be enabled to support coexistence operations so as to receive WiFi signals while utilizing full spectrum capture in the BNC/FSC dongle 260. In an exemplary embodiment of the invention, the WiFi transceiver 290 may utilize a dedicated RF front-end circuitry for data transmission and reception using WiFi. In another exemplary embodiment of the invention, the WiFi transceiver 290 may share a RF front-end circuitry with the BNC/FSC transceiver 270 for data transmission and receiving using WiFi.

In accordance with an exemplary embodiment of the invention, in instances where the BNC/FSC enabled device 200 comprises a BNC/FSC dongle that may be affixed to a barrier such as a concrete wall, a first portion of the BNC/FSC dongle may be coupled to, for example, a router via a first WiFi connection and a second portion of the BNC/FSC dongle may be coupled to a PC via a second WiFI connection. Accordingly, the BNC/FSC dongle may be operable to provide BNC/FSC bridging across the wall and the remaining connectivity may utilize a WiFI connection.

The processor 271 may comprise suitable logic, circuitry, interfaces and/or code that may be enabled to perform a variety of signal processing tasks such as channel selection or filtering, digital scaling, rate conversion, carrier/time synchronization/recovery, equalization/demapping, channel decoding and/or controlling the operation of the alignment/positioning module 269. The processor 271 may be substantially similar to the processor 240, which is illustrated in FIG. 2A. The processor 271 may be operable to coordinate and control operations of the BNC/FSC transceiver 270, the Bluetooth transceiver 280, and the WiFi transceiver 290 to communicate corresponding radio signals while utilizing full spectrum capture. For example, the processor 240 may manage, activate or deactivate the BNC/FSC transceiver 270 according to received Bluetooth signals via the Bluetooth transceiver 280. The processor 260 may also be operable to synchronize the operation of the BNC/FSC transceiver 270 and the Bluetooth transceiver 280, for example, so as to reduce time delay for accurately determining the location of an object of interest.

The processor 271 may be operable to control the alignment/positioning module 269. In this regard, the processor 271 may be operable to determine when two paired BNC/FSC dongles are positioned so as to provide optimal communication between the two sides of the BNC/FSC dongle. The processor 271 may be operable to control the generation and updating of visual and/or audio cues that are handled by the visual and/or audio indicator module 269a, which may be utilized to enable alignment of both portions of the BNC/FSC dongle. The visual cues may be provided by the LED(s)/LCD(s) 269b and the audio cues may be provided by the speaker 269c.

In various exemplary embodiments of the invention, the processor 271 may enable configuration of the BNC/FSC dongle 260 to operate in different communication environments. In this regard, for example, power, distance and bandwidth may be configured in order to stay within the FCC masks and limits and at the same time, provide optimal performance across the entire bandwidth. The processor 271 may also control pairing of two BNC/FSC dongles.

The memory 291 may comprise suitable logic, circuitry, interfaces and/or code that may enable storage of data and/or other information utilized by the processor 271. For example, the memory 291 may be utilized to store information such as available operation spectrum bands that the BNC/FSC dongle 260 may operate, and channels in the available operating spectrum bands. The memory 291 may be enabled to store executable instructions to manage or configure the BNC/FSC transceiver 270, the Bluetooth transceiver 280, the alignment/positioning module 269, the wired interface 261 and/or the WiFi transceiver 290 for desired behavior. The memory 250 may comprise RAM, ROM, low latency nonvolatile memory such as flash memory and/or other suitable electronic data storage capable of storing data and instructions.

In operation, the processor 271 may be operable to pair two BNC/FSC dongles and to control the alignment/positioning module 269 so as to provide optimal alignment of the BNC/FSC dongle in instances when the BNC/FSC dongle is being utilized for bridging across a barrier such as a dwelling wall. The processor 271 may be operable to manage and control operation of the components of the BNC/FSC dongle 260 such as the BNC/FSC transceiver 270, the Bluetooth transceiver 280 and the WiFI transceiver 290 to communicate corresponding radio signals for applications of interest. Transceivers such as the BNC/FSC transceiver 270 may be enabled to utilize full spectrum capture for data communication to support the applications of interest. For example, a transceiver such as the BNC/FSC transceiver 270 may be enabled to digitize the entire operation spectrum band, 1 GHz, for example, for instant access to channels anywhere in the operation spectrum band.

Figure 3:
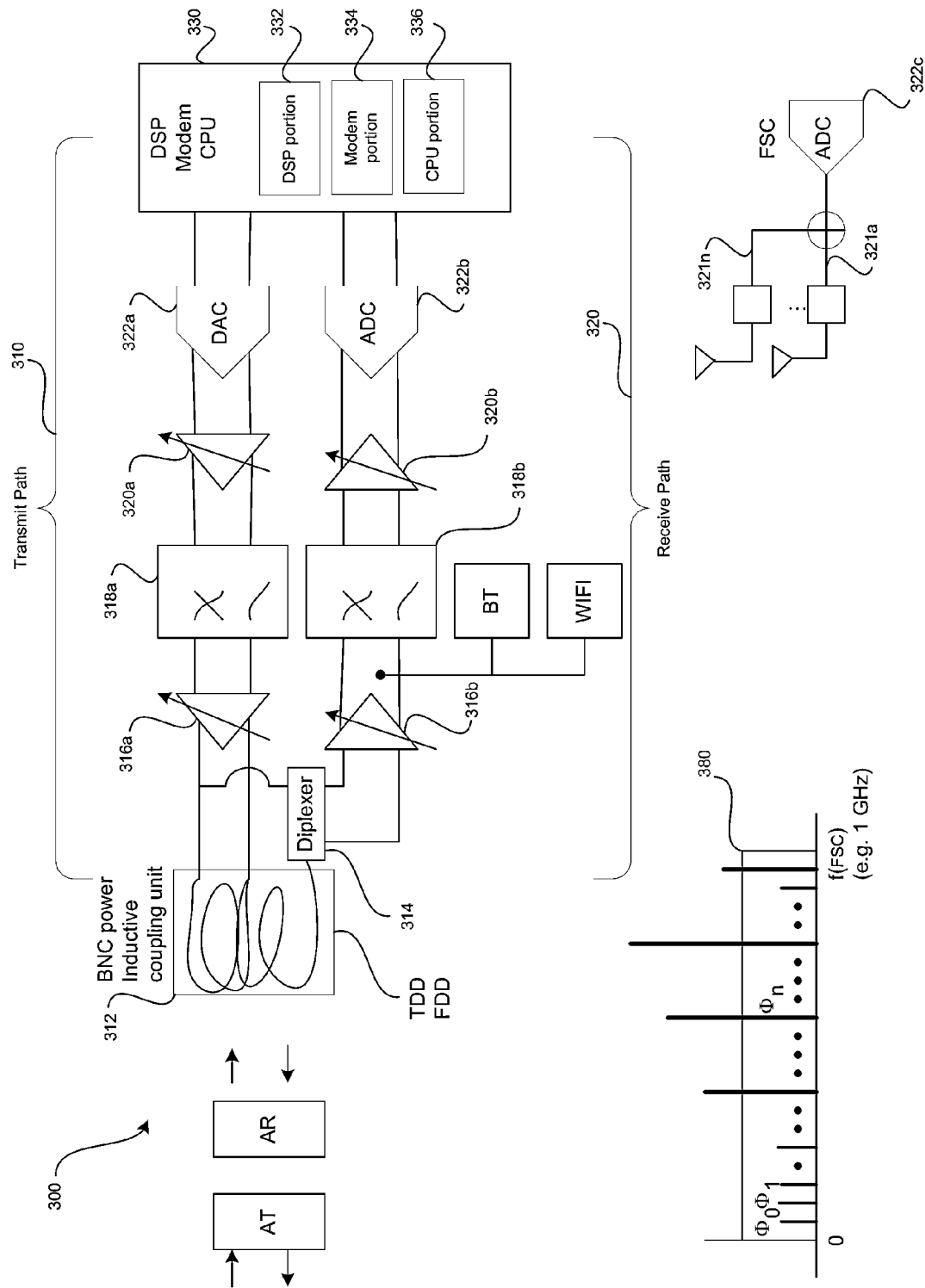
FIG. 3 is a block diagram that illustrates an exemplary controller, such as a Broadband Near-Field Communication (BNC) controller for example, utilizing full spectrum capture (FSC), in accordance with an exemplary embodiment of the invention.

FIG. 3 is a block diagram that illustrates an exemplary controller, such as a Broadband Near-Field Communication (BNC) controller for example, utilizing full spectrum capture (FSC), in accordance with an exemplary embodiment of the invention. Referring to FIG. 3, there is shown a controller 300, which may be, for example, a BNC/FSC controller. The BNC/FSC controller 300 may comprise a transmit path 310 and a receive path 320, which share a DSP/Modem/CPU unit 330. A BNC power inductive coupling unit 312 is coupled to a diplexer 314 such that the BNC power inductive coupling unit 312 may be shared by the transmit path 310 and the receive path 320 for data transmission and data receiving, respectively, over channels, $\phi_1, \ldots, \phi_n$, within a full spectrum band 380. In addition, the transmit path 310 may comprise variable gain amplifiers 316a and 320a, a transmit filter 318a, and a DAC 322a. The receive path 320 may comprise variable gain amplifiers 316b and 320b, a receive filter 318b, and an ADC 322b.

In an exemplary operation, the BNC power inductive coupling unit 312 may comprise suitable logic, circuitry, interfaces and/or code that may be utilized as an antenna for wireless communication operations for signal transmission and reception through the transmit path 310 and the receive path 320, respectively. The BNC power inductive coupling unit 312 may comprise a single near-field inductive coupling device such as a coil or an antenna or an antenna coil, for example. In some instances, the single coil may be utilized for wireless communication operations that are based on time-division duplexing (TDD) and/or frequency-division duplexing (FDD). In addition to being utilized as an antenna for wireless communication operations, the single coil may be utilized for receiving charge from a charging pad, for example, to power or operate at least a portion of the device that comprises the various components shown in FIG. 3. The coil may be communicatively coupled to circuitry (not shown) that may be utilized to manage and/or store the received charge.

In an exemplary embodiment of the invention, the coil of the BNC power inductive coupling unit 312 may comprise a plurality of coil turns. In this regard, the number of coil turns that correspond to the receive path 320 may be larger than the number of coil turns that correspond to the transmit path 310 so as to obtain a low transmit gain and high receive gain operation.

In an exemplary embodiment of the invention, the BNC power inductive coupling unit 312 may also be equalized as part of full spectrum capture, when used as an antenna. Unlike narrowband systems in which the signals are narrowband compared to the characteristics of the antenna, the antenna in full spectrum capture may typically not be optimized for the application. Since the operation for full spectrum capture may be at lower frequencies and at low powers than other wireless technologies, it may be possible to utilize antennas with poor characteristics by equalizing the power provided to the antenna. In this manner, the power from the antenna may be maximized without violating any Federal Communications Commission (FCC) constraints. A sensor may be implemented to detect or sense the impedance of the antenna across a range of frequencies. The output from the sensor may be provided as feedback for digital processing to enable subcarrier equalization in order to obtain an optimal power transfer out of the antenna. For example, at frequencies where the antenna performance is poor (e.g., 10% efficiency), the power may be increased to overcome the inefficiencies. Since only a few frequencies may require additional power to compensate for the inefficiencies, the overall power transmitted may still be within FCC requirements. For example, power for certain frequencies may be increased by as much as 30 dB while the overall power transmitted remains within FCC requirements. In some instances, there may be a correspondence between the frequencies at which the transmit antenna has poor performance and the frequencies at which the receive antenna has poor performance. This correspondence may be utilized for purposes of antenna equalization. Antenna equalization may comprise over-compensation and/or under-compensation at one or more frequencies based on the characteristics of the transmit antenna and/or the receive antenna.

In order to combine the phase carriers, equalization may need to be performed. To utilize equalization, there may be known pilot symbol patterns, which may be scattered throughout the portion of the spectrum being considered. The pilot symbols may be at a known phase and are not randomized nor modulated by a data stream. The whole channel may be equalized based on these pilot symbols, which enables phase recovery. By utilizing pilot symbols, OFDM or WCDMA techniques may be supported for the modem portion described above. In broadcast, OFDM techniques may be utilized in which pilot symbols or pilot tones may be picked up, the pilot symbols or pilot tones being fixed or scattered and rotated over time. WiFi on the other hand, may utilize preambles and/or pilot symbols to enable synchronization.

In an exemplary embodiment of the invention, high receive gain may also be achieved by aiming the antenna in a particular direction. For full spectrum capture in personal area networks, for example, omni-directional antennas for both transmit and receive operations may be more suitable than asymmetric antennas. On the other hand, for communicating or penetrating across a wall for indoor dwelling or other like barrier, an asymmetric antenna configuration may be more suitable for full spectrum capture since it may be preferable to receive in one direction and not the other.

The transmission characteristics of a remote antenna or coil may be represented and/or modeled by the block labeled area of transmission (AT), while the reception characteristics of a local antenna or coil may be represented and/or modeled by the block labeled area of receiving (AR). In an exemplary embodiment of the invention, the remote antenna may also have reception characteristics and the local antenna may also have transmission characteristics.

In one exemplary embodiment of the invention, synchronization may occur by utilizing a standard frequency pattern for the antenna when a lower coding rate with more coding protection is being utilized. Once two devices are synchronized, the devices may start a negotiation to optimize the channel. For example, each device may provide antenna performance information and/or channel conditions information to the other device based on an information conveyance protocol. By utilizing the protocol information, impedance sensing, and signal processing, the channel conditions may be identified and considered when determining the transmit power distribution across antenna frequencies. In this regard, the devices may be operable to perform signal processing algorithms that allow the devices to dynamically determine local and remote antenna characteristics, and/or channel conditions or impairments, including the presence of blockers or interferers, for example. A tracking scheme may be implemented for exchanging channel and/or antenna characteristics, which may include a preamble, a pattern field, and/or decoding rate information. These operations may be performed at the PHY and/or MAC layers, for example, through the DSP/Modem/CPU unit 330.

Some of the techniques described above may be applied to overcome the poor performance that some antennas may have over a wide spectrum. The wide spectrum requirements of full spectrum capture are such that the ratio of the lower frequencies to the higher frequencies is higher than a similar ratio for ultra-wideband (UWB), for example. As a result, antenna characteristics over the wide spectrum of full spectrum capture operation may be continuously monitored and considered where such operations may not be needed for UWB.

In exemplary embodiments of the invention, other wireless technologies, for example, ZigBee, Bluetooth, WLAN, and WiMax, may be supported in addition to full spectrum capture. In this regard, a separate and/or better antenna may be needed to support TDD for Bluetooth, for example, at least on the receive path 320. The transmit path 310 may be a reverse implementation of the receive path 320. In ZigBee, Bluetooth, WLAN, and WiMax, there may be mixing and filtering operations at the front end that allows the signal path to have a narrower band than full spectrum capture, which in turn may benefit from a dedicated antenna.

In an exemplary embodiment of the invention, other wireless technologies such as, for example, ZigBee, Bluetooth, WLAN, and WiMax may coexist with full spectrum capture in the same BNC/FSC enabled device 200. In this regard, coexistence operations may be supported. Two or more receive antennas may be utilized, each of which receives signals from different wireless technologies such as, for example, ZigBee, Bluetooth, WLAN, and WiMax. Each of the received signals may be processed or filtered before they are all combined and digitally converted for full spectrum capture operations. In addition, utilizing device components such as the ADC 322b and/or the DAC 322a, which require less power, may enable multimode devices. In an exemplary embodiment of the invention, multimode devices such as the BNC/FSC enabled device 200 may utilize full spectrum capture as a single radio to support multiple modes or as a universal interface by having one or more of the analog components, such as the filters, for example, be band-selectable or tunable. The data converter may still run at the appropriate rate to enable handling of the filtered data. In this regard, the full spectrum capture may be utilized for Bluetooth, IEEE 802.11, and/or WiFi communications.

In some exemplary embodiments of the invention, a delta-sigma bandpass converter may be utilized in connection with the ADC 322b such that the sampling may have a transfer function that peaks at a certain frequency and drops off at other frequencies. By having a converter that has a band-pass transfer function and not a low-pass transfer function it may be possible to modify the ADC 322b and perform conversion operations utilizing less power.

Operating full spectrum capture at higher frequencies, such as 5 GHz or 10 GHz, for example, based on an efficient ADC and/or DAC, may support capture or reception of IEEE 802.11 signals. The filtering and processing may be performed digitally. In some instances, the front-end of the full spectrum capture may be made coarsely tunable to be able to remove, in the analog domain, certain frequencies, bands, and/or unwanted intermediate data. Such an approach may provide an improvement in dynamic range. Digital signal processing may then be utilized for any further filtering operations that may be needed.

In an exemplary embodiment of the invention, the full spectrum capture may be implemented without mixers. In this regard, the data pipe may remain large until the data becomes digital. In addition, not having mixers in full spectrum capture may remove additional components in the transmit path 310 and the receive path 320 that may result in a lowered dynamic range. Distortion and/or noise performance may also be improved since mixers are not included in the transmit path 310 and the receive path 320.

The diplexer 314 may comprise suitable logic, circuitry, interfaces and/or code that may be operable to reduce the likelihood that signal transmission may saturate the receive path 320. The diplexer 314, however, may not be needed when very low power levels are utilized over a wide bandwidth, as may occur during full spectrum capture operations. In such instances, transmission and reception of signals may occur concurrently without having signal transmission interfere with signal reception. In some exemplary embodiments of the invention, a switch may be utilized instead of the diplexer 314 to switch between transmission and reception in TDD communications.

The transmit filter 318a and the receive filter 318b may comprise suitable logic, circuitry, interfaces and/or code that may be operable to provide or perform spectral filtering to support full spectrum capture operations. In this regard, the transmit filter 318a and the receive filter 318b may be utilized to filter frequencies outside the full spectrum capture frequency range. In some instances, the characteristics of the antenna (e.g., coil) may be such that it may perform filtering functions and, in those instances, transmit and/or receive filters may not be needed.

The DAC a and the ADC 322b may comprise suitable logic, circuitry, interfaces and/or code that may be operable to perform Digital to Analog data generation or conversion and Analog to Digital data collections, respectively. In an exemplary embodiment of the invention, the DAC 322a and the ADC 322b may be operable to perform high speed digital-to-analog and analog-to-digital conversion, respectively. In this regard, the DAC 322a and the ADC 322b may be operable at very high speeds to enable full spectrum capture. The digital signals produced by the ADC 322b and received by the DAC 322a may be referred to as digital baseband signals. The DAC 322a and the ADC 322b may be communicatively coupled to the DSP/Modem/CPU unit 330.

The various variable gain amplifiers 316a and 320a, and 316b and 320b may comprise suitable logic, circuitry, code, and/or interfaces that may be operable to have the gain that may be applied by the variable gain amplifier 316a, for example, to an input signal be programmable or controlled. One or more of the variable gain amplifiers in the transmit path 310 may comprise power amplifiers, while one or more of the variable gain amplifiers in the receive path 320 may comprise low-noise amplifiers. The various variable gain amplifiers 316a and 320a, and 316b and 320b may be operable to handle low levels of power spread over a wide bandwidth to support full spectrum capture operations.

The DSP/Modem/CPU unit 330 may comprise circuitry that may comprise a digital signal processor (DSP) portion 332, a modulator-demodulator (modem) portion 334, and/or a central processing unit (CPU) 336. The DSP portion 332 may comprise suitable logic, circuitry, code, and/or interfaces that may be operable to clean up signals. For example, the DSP portion 332 may be operable to perform channel selection and/or filtering, digital scaling, and/or rate conversion. The rate conversion or sample rate conversion may be performed utilizing variable rate interpolators. For example, a 13.5 MHz signal that is received may be interpolated down to a 13.3 MHz signal during rate conversion operations.

The modem portion 334 may comprise suitable logic, circuitry, code, and/or interfaces that may be operable to perform synchronization, equalization and/or demapping, and/or channel encoding when processing received signals. The channel decoder may utilize a concatenated code such as an inner code and an outer code. An example of such a concatenated code may comprise a low-density parity-check (LDPC) code followed by a Bose-Chaudhuri-Hocquenghen (BCH) code. The channel decoder may utilize a concatenated code that comprises a Viterbi code, for example. The modem portion 334 may also be operable to perform channel encoding and/or equalization, and/or mapping when processing signals for transmission. During transmission synchronization is typically not needed. The operation of the modem portion 334 may be implemented using an orthogonal frequency-division multiplexing (OFDM) approach or an approach based on code division multiple access (CDMA).

The CPU portion 336 may comprise suitable logic, circuitry, code, and/or interfaces that may be operable to support MAC layer and/or Link layer operations for full spectrum capture. The MAC layer may support the ability to share the medium, which utilizing full spectrum capture allows the medium to be shared with fewer collision type issues. For example, when everyone is sending less than the full bandwidth (e.g., 1 GHz), the operation may be easier than if everyone is trying to send close to the full bandwidth, in which case some form of negotiation between devices may be supported by the MAC layer.

The MAC layer and the Link layer enable access sharing, which may use OFDM techniques or some form of CDMA as described above. Simple CDMA techniques may also be used. For CDMA-like operations, low-power multiple phase carriers may be sent, such as 8 k, 10 k, 12 k, 32 k, or 64 k, for example. Each of the phase carriers may have a random phase. When the random phase is known, a scan or search may be performed for those known phase carriers. In some instances, there may be one or more preset channels for each search. Since the power utilized in full spectrum capture is typically very low, the search or scan goes through each of the channels. If the different phase carriers may be combined, it may be possible to obtain a significant coding or dispreading gain. OFDM techniques may provide, at least in some instances, an approach in which some of the sub-channels may be left out or left unused, especially when it is known that those channels may have some form of interference. For example, it may be preferable not to transmit in certain channels that are known to be dead and/or where it may be preferable to ignore information from a channel that has noise and is likely to degrade the performance of the combined signal.

In some exemplary embodiments of the invention, the spectral bandwidth corresponding to full spectrum capture operations may extend to a frequency (e.g., $f_{FSC}$) of approximately 1 GHz, for example. The full spectrum capture spectral bandwidth may depend on the frequency of operation of the ADC 322b and/or of the DAC 322a. If the ADC 322b and/or the DAC 322a is operable to capture 10 GHz of bandwidth, for example, full spectrum capture at or near 10 GHz may be performed.

In an exemplary embodiment of the invention, the BNC/FSC enabled device 200 may comprise one or more other receive paths 321a-321n in addition to the receive path 320 with full spectrum capture. In this regard, the one or more other receive paths 321a-321n may comprise components for handling received signals via WiFi, WiMax, ZigBee, RFID, and/or Bluetooth. In an exemplary embodiment of the invention, when supporting additional wireless technologies, such as Bluetooth and/or WiFi, for example, a portion of the receive path 320 with full spectrum capture may be coupled to the one or more other receive paths 321a-321n. In other words, the BNC/FSC enabled device 200 may be configured to utilize different RF front ends to support communication via additional wireless technologies. In an exemplary embodiment of the invention, the BNC/FSC enabled device 200 may be configured to utilize a single RF front end to handle communication via BNC/FSC, WiFi, WiMax, ZigBee, RFID, BNC and Bluetooth.

In one exemplary embodiment of the invention, a device such as the BNC/FSC enabled device 200 may support a processing path for full spectrum capture and another processing path for narrowband communication. The device may be operable to switch between the two based on the operation of the BNC/FSC enabled device 200. Moreover, when switching to the narrowband communication processing path, the amount of power under consideration may drop from the amount of power being handled by the full spectrum capture processing path. The narrowband communication processing path may share some components with the full spectrum capture processing path such as low-noise amplifiers 316a, 316b, 320a and 320b.

Figure 4:
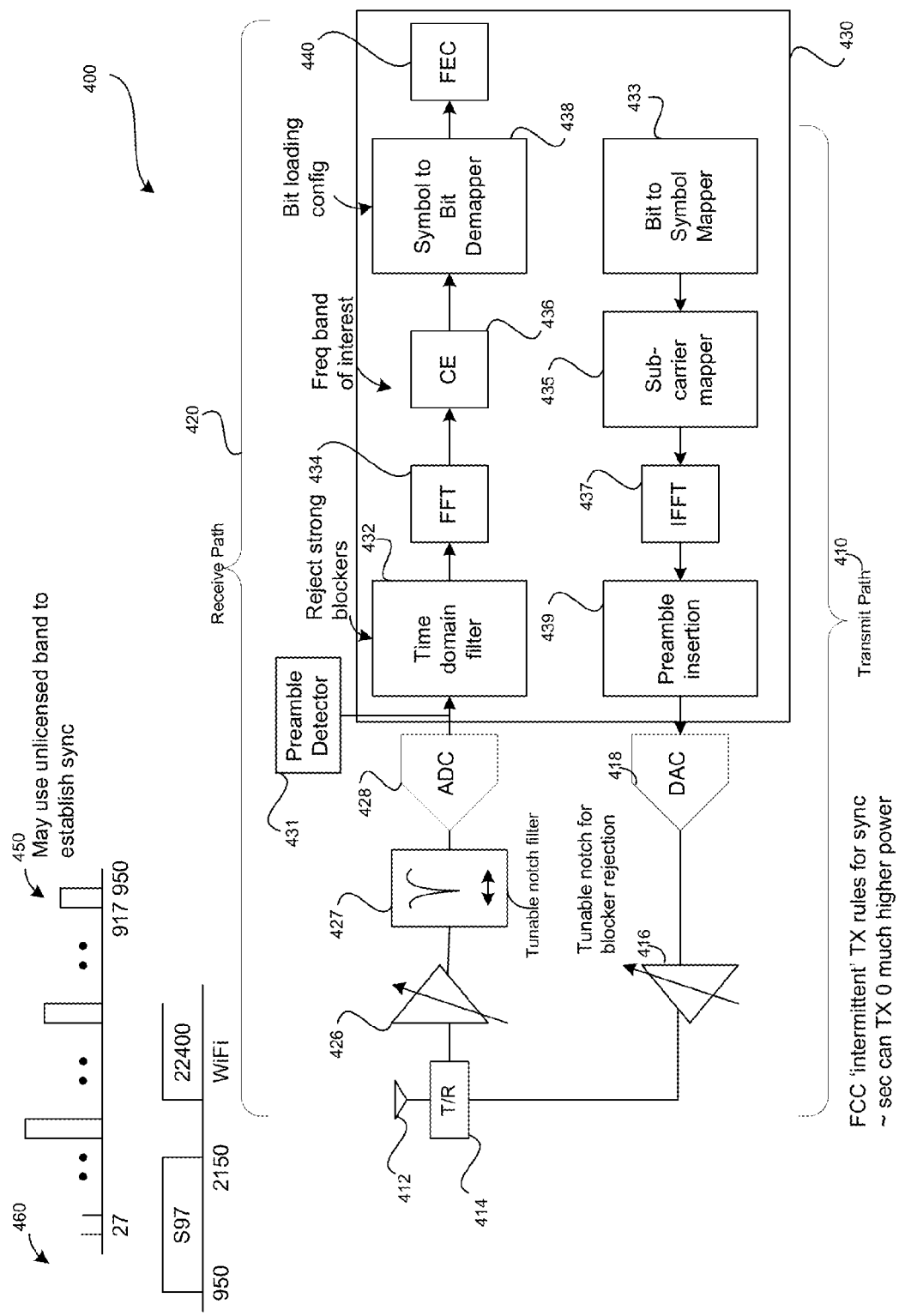
FIG. 4 is a block diagram that illustrates an exemplary implementation for a controller, such as a Broadband Near-Field Communication (BNC) controller for example, that utilizes a tunable notch filter in a receive path with full spectrum capture (FSC), in accordance with an exemplary embodiment of the invention.

FIG. 4 is a block diagram that illustrates an exemplary implementation for a controller, such as a Broadband Near-Field Communication (BNC) controller for example, that utilizes a tunable notch filter in a receive path with full spectrum capture (FSC), in accordance with an exemplary embodiment of the invention. Referring to FIG. 4, there is shown a controller 400, which may be a hybrid BNC/FSC controller, for example. The hybrid BNC/FSC controller 400 may comprise a transmit path 410, a receive path 420, and a DSP/Modem/CPU unit 430. In addition, the transmit path 410 may comprise a variable gain amplifier 416 and a DAC 418. The receive path 420 may comprise a variable gain amplifier 426, a tunable notch filter 427, and an ADC 428. The transmit path 410 and the receive path 420 may be coupled to the same antenna 412 through a transmit-receive (T/R) switch 414. In this regard, the variable gain amplifiers 416 in the transmit path 410 may be turned off during receive, and the variable gain amplifiers 426 in the receive path 420 may be turned off when transmit. The antenna 412, the variable gain amplifiers 416 and 426, the DAC 418 and the ADC 428 may be similar to the BNC power inductive coupling unit 312, the variable gain amplifiers 316b, 320a, the DAC 322a, and the ADC 322b of FIG. 3, respectively.

The T/R switch 414 may comprise suitable logic, circuitry, interfaces and/or code that may be operable to switch between transmit and receive. In some exemplary embodiments of the invention, the T/R switch 414 may be positioned or placed between the variable gain amplifier 426 and the tunable notch filter 427 in the receive path 420. In some instances, since the power being transmitted may be low enough, the T/R switch 414 may not be needed.

The tunable notch filter 427 may comprise suitable logic, circuitry, code, and/or interfaces that may be operable to reject a blocker or interference signal. The blockers may be strong and saturate the ADC 428. In this regard, the tunable notch filter 427 may be utilized to remove the strongest blocker. The tunable notch filter 427 may be implemented on-board or on-chip, for example. For high frequencies, the tunable notch filter 427 may be on-chip, and for low frequencies, it may be off-chip. While the tunable notch filter 427 may affect the frequencies that are adjacent to the frequency being removed, the full spectrum capture spectrum overall may not be significantly affected because of the broadband nature of full spectrum capture. Sensing circuitry may be utilized to detect the strong blockers and provide feedback to adjust the frequency of the tunable notch filter 427.

The receive path 420 may also comprise a preamble detector 431, a time-domain filter 432, a Fast Fourier Transform (FFT) block 434, a channel equalizer (CE) 436, a symbol to bit demapper, and/or a forward error correction (FEC) block 440. The preamble detector 431 may comprise suitable logic, circuitry, code, and/or interfaces that may be operable to detect OFDM symbols in time domain from time domain samples from the tunable notch filter 427. The time-domain filter 432 may comprise suitable logic, circuitry, code, and/or interfaces that may be operable to reject strong blocker signals. The FFT block 434 may comprise suitable logic, circuitry, interfaces and/or code that may be operable to perform Fast Fourier Transform (FFT) over OFDM symbols from the time domain filter 432. The FFT block 434 may be operable to convert time domain samples of the OFDM symbols to corresponding frequency domain samples for frequency domain channel equalization via the CE 436. The CE 436 may comprise suitable logic, circuitry, code, and/or interfaces that may be operable to provide channel equalization for frequency bands of interest utilizing frequency domain samples supplied from the FFT block 434. The symbol to bit demapper 438 may comprise suitable logic, circuitry, code, and/or interfaces that may be operable to perform bit-loading configuration.

The transmit path 410 may also comprise a bit to symbol mapper 433, a sub-carrier mapper 435, an Inverse Fast Fourier Transform (IFFT) block 437, and/or a preamble insertion block 439. The bit to symbol mapper 433 may comprise suitable logic, circuitry, code, and/or interfaces that may be operable to perform symbol-loading configuration. The sub-carrier mapper 435 may comprise suitable logic, circuitry, code, and/or interfaces that may be operable to map sub-carriers to avoid regulated frequencies. The avoidance of regulated frequencies may be binary or graduated. The IFFT block 437 may comprise suitable logic, circuitry, interfaces and/or code that may be operable to perform Inverse Fast Fourier Transform (IFFT) over frequency domain samples of OFDM symbols from the sub-carrier mapper 435. The IFFT block 437 may be operable to convert frequency domain samples of the OFDM symbols to corresponding time domain samples. The preamble insertion block 439 may comprise suitable logic, circuitry, code, and/or interfaces that may be operable to insert a preamble into time domain samples from the IFFT block 437 in a manner that deals with frequency avoidance.

Although OFDM-based implementation is illustrated for full spectrum capture, the invention may not be so limited. Accordingly, other wireless technologies such as CDMA technology and WCDMA (spread spectrum approach) technology may also be utilized for full spectrum capture without departing from the spirit and scope of various exemplary embodiments of the invention.

In exemplary embodiment of the invention, on the receive path 420, the variable gain amplifier 426, as a LNA typically drives the very fast ADC 428 in order to achieve full spectrum capture performance. The full spectrum capture operations may be typically used with packet-based systems. In exemplary embodiment of the invention, the full spectrum capture operations may comprise having a MAC layer picking which frequency bands are to be used and coordinating that information with the device front-end. The MAC layer may also determine and/or coordinate bit loading, for example. In this regard, the MAC layer may determine which frequencies have good signal-to-noise ratio (SNR) and which ones do not, and may allocate more bits to the ones with good SNR than to those with lower SNR.

In exemplary embodiment of the invention, on the transmit path 410, there may be frequency ranges in which the full spectrum capture may not want to transmit. For example, the full spectrum capture may be explicitly prohibited by regulatory rules from transmitting in certain frequencies. In another example, the BNC/FSC enabled device 200 may sense that a television channel is being used and may not want to transmit in that frequency. As described above, the avoidance of certain frequencies may be implemented in a binary or graduated fashion. For example, in a binary case, transmission at a certain frequency or note may be ON or OFF. For the graduated case, the power level of the transmitted signal may be based on how strong other signals are in that same frequency. For example, the power level may be stronger for transmission at the frequency of the television channel when the signal strength of the television channel is low, which may indicate that the signal is far away.

To start communication between two devices, a time reference may be established and there be an agreement about which frequencies are to be utilized. In exemplary embodiment of the invention, various ways in which synchronization may be supported may be utilized by the hybrid BNC/FSC controller 400. For example, one way that may be supported may be for the hybrid BNC/FSC controller 400 that supports full spectrum capture to awake and look for preambles or beacons of some sort. This approach may consume a lot of power. Another approach that may be supported may be to have both sides, that is, the two peer devices that are to communicate, look at one or more pulse per second (PPS) signals used in global positioning systems (GPS). When any one device wakes up, it may be realigned based on a PPS signal. In some instances, the PPS signal that may be utilized for synchronization is from another device that is nearby. This type of synchronization may occur even when there is a lot of drift and/or when there is some degree of inaccuracy with the PPS signal. In some exemplary embodiments of the invention, there may be an indication received or generated by the device of how accurate the PPS signal is in order to determine whether the PPS signal is suitable for synchronization.

In exemplary embodiment of the invention, the hybrid BNC/FSC controller 400 may utilize unlicensed bands to establish synchronization. In this regard, synchronization information may also be provided in an unlicensed band, such as the cordless region 450, for example, between 917 MHz and 950 MHz. The hybrid BNC/FSC controller 400 may look into this region of the spectrum to find synchronization information. Similarly, frequencies down at around 27 MHz (e.g., frequencies for operation of garage door openers) 460 may be utilized by devices looking for synchronization information.

In some exemplary embodiments of the invention, the two peer devices looking to synchronize may operate based on an established agreement on time regarding how long to look for a neighbor to synchronize. Since synchronization may take some time at relatively large power levels, looking for a neighbor for a long period of time may result in power being drained from the searching device.

In an exemplary embodiment of the invention, preset OFDM symbols with randomized phases may be utilized in a correlation operation to enable synchronization with another device. With OFDM enabled, when a preamble is utilized, the preamble may typically cover the entire frequency band. The preamble may need to be changed to avoid certain frequencies as determined by regulatory rules and/or operating conditions. The preamble may then be implemented before the FFT block 434 in the receive path 420. Both sides may need to be aware of the preamble characteristics in order to enable communication between them.

In exemplary embodiment of the invention, the full spectrum capture may provide very short duty cycles for low power. In this regard, FCC intermittent burst allows for the transmission, at the packet level, of much higher power during short burst. The amount of power that is provided may be based on the frequency.

Figure 5:
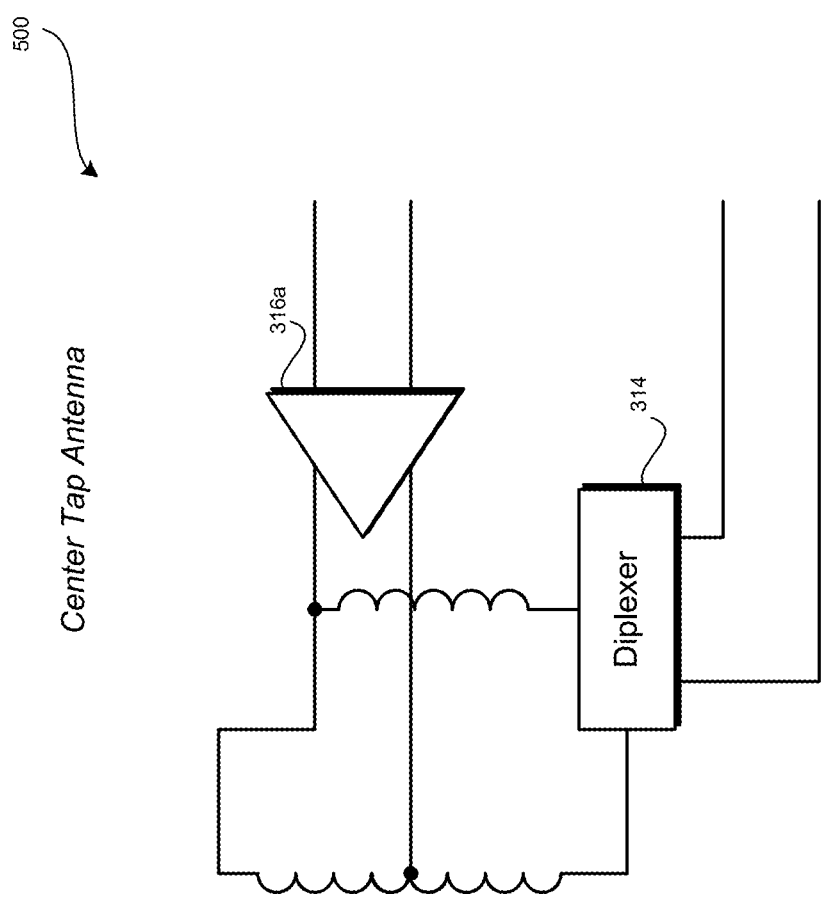
FIG. 5 is a block diagram that illustrates an exemplary center tap antenna that is utilized for full spectrum capture (FSC) in, for example, Broadband Near-Field Communication (BNC), in accordance with an exemplary embodiment of the invention.

FIG. 5 is a block diagram that illustrates an exemplary center tap antenna that is utilized for full spectrum capture (FSC) in, for example, Broadband Near-Field Communication (BNC), in accordance with an exemplary embodiment of the invention. Referring to FIG. 5, there is shown a center tap antenna 500. The center tap antenna 500 may be designed or implemented such that the impedance circuitry and the voltage circuitry may be directly coupled to the center tapping of the whole coil (antenna).

Figure 6:
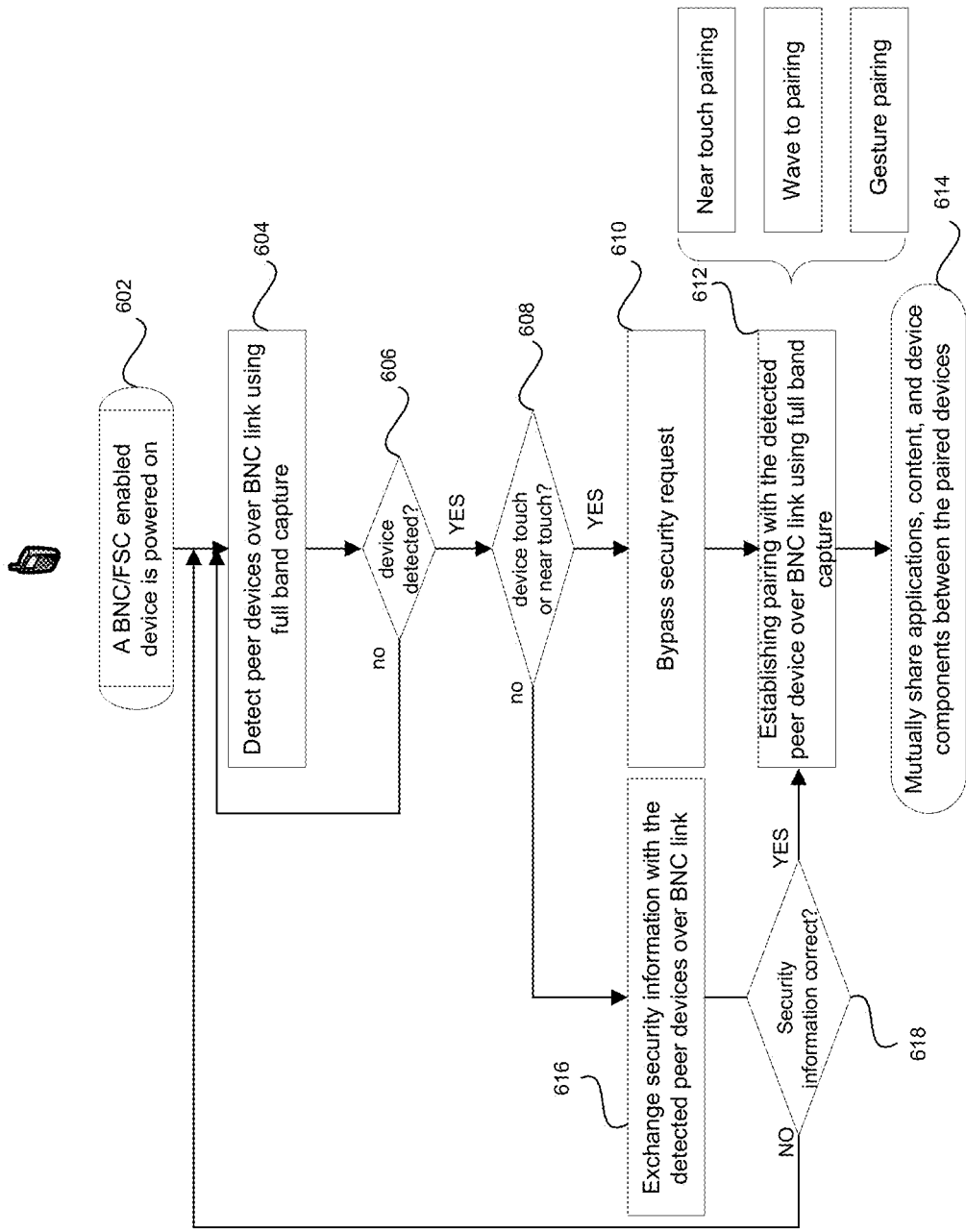
FIG. 6 is a flow diagram that illustrates exemplary steps for device pairing and security in, for example, Broadband Near-Field Communication (BNC) utilizing full spectrum capture (FSC), in accordance with an exemplary embodiment of the invention.

FIG. 6 is a flow diagram that illustrates exemplary steps for device pairing and security in Broadband Near-Field Communication (BNC) utilizing full spectrum capture (FSC), in accordance with an exemplary embodiment of the invention. Referring to FIG. 6, in step 602, a BNC/FSC enabled device such as the BNC/FSC enabled device 200 is powered on. The BNS/FSC enabled device may comprise a BNC/FSC dongle 260 that may be operable to communicate across a barrier such as a dwelling wall. In this regard, the two BNC/FSC devices that are placed on either side of the dwelling wall may comprise peer devices that may be paired.

The exemplary steps start in step 604, where the BNC/FSC enabled device 200 may be operable to detect peer devices over BNC link utilizing full spectrum capture. For example, the BNC/FSC enabled device 200 may monitor signals or messages received via the BNC power inductive coupling unit 312 for device-identifying reference information such as a MAC-ID, MSN or a peer address in the communication network, where the pairing takes place. In step 606, the BNC/FSC enabled device 200 may determine whether peer BNC/FSC enabled devices are detected over a BNC link. In instances where one or more peer BNC/FSC enabled devices are detected, then in step 608, the BNC/FSC enabled device 200 may determine whether it touches or nearly touches the detected peer BNC/FSC enabled devices. In instances where the BNC/FSC enabled device 200 touches or nearly touches the detected peer BNC/FSC enabled devices, then in step 610, the BNC/FSC enabled device 200 may bypass security request. In other words, the BNC/FSC enabled device 200 may not exchange or communicate security information with the detected peer BNC/FSC enabled devices. The security information may comprise user account names and logo, password, PIN number and other credentials, security categories, encryption keys, cryptographic keys, an authentication value and sequence number, signatures to be included, digital certificates, source IP address, destination IP address, and/or port numbers.

In step 612, the BNC/FSC enabled device 200 may be operable to establish pairing with each of the detected peer BNC/FSC enabled devices over BNC link using full spectrum capture. The pairing may comprise near touch pairing, wave to pairing and gesture pairing. Touch or near touch pairing refers to pairing the BNC/FSC enabled device 200 with a peer BNC/FSC enabled device by simply touching or near touching the two BNC/FSC enabled devices to be paired or connected to the network. Wave to pair enables the pairing of two BNC/FSC enabled devices when they are within certain proximity of each other, for example, ¼ of a wavelength of each other. In this regard, one device may be waved next to the other within the distance of ¼ wavelength to accomplish pairing.

In one exemplary embodiment of the invention, the waving may have to occur in a specific manner or pattern to effectively pair the two BNC/FSC enabled devices. If the waiving is not done in that specific manner or pattern, then no pairing is done and the devices may not communicate with each other or will not communicate secure information with each other. This is done, for example, to avoid unintended pairings based simply on proximity in crowded environments. This signature for waving or waving in a particular pattern may be referred to as gesture or signature pairing. In this regard, the device would not only need to be within certain proximity, but also would need to be moved or waived in a pre-defined manner, during which the devices are brought into such proximity. The BNC/FSC enabled devices may take advantage of existing motion/directional devices, such as a gyroscope, to capture a unique gesture or signature for each user, and only pair the communication device if that gesture or signature is detected during a proximity event.

In step 614, the BNC/FSC enabled device 200 may mutually share applications, multimedia content or files, and device components such as display with the detected peer BNC/FSC enabled devices. In this regard, sharing of the display, multimedia content or files may occur among the BNC/FSC enabled device 200 and the detected peer BNC/FSC enabled devices regardless of who is receiving the display content. For example, a user of BNC/FSC enabled device 200 at a mall may take a picture and share the screen, which displays the picture, with all their friends who are standing there. In this regard, the user is not concerned whether someone is eavesdropping and is viewing the picture. The BNC/FSC enabled device 200 may be controlled so the signals are not communicated beyond a certain range.

In an exemplary embodiment of the invention, a secure communication session may be established for paired devices based on proximity. In this regard, devices may be excluded from the secure communication session if they are located outside that proximity.

In step 606, in instances where no peer BNC/FSC enabled device is detected, then the exemplary steps return to step 604.

In step 608, in instances where the BNC/FSC enabled device 200 does not touch or near touch the detected peer BNC/FSC enabled devices, then in step 616, where the BNC/FSC enabled device 200 may exchange security information with the detected peer devices over BNC link. In step 618, the BNC/FSC enabled device 200 may determine whether the security information from the detected peer devices is correct. In instances where the received security information is correct, then exemplary process continues in step 612. Otherwise the exemplary steps return to step 604.

Figure 7:
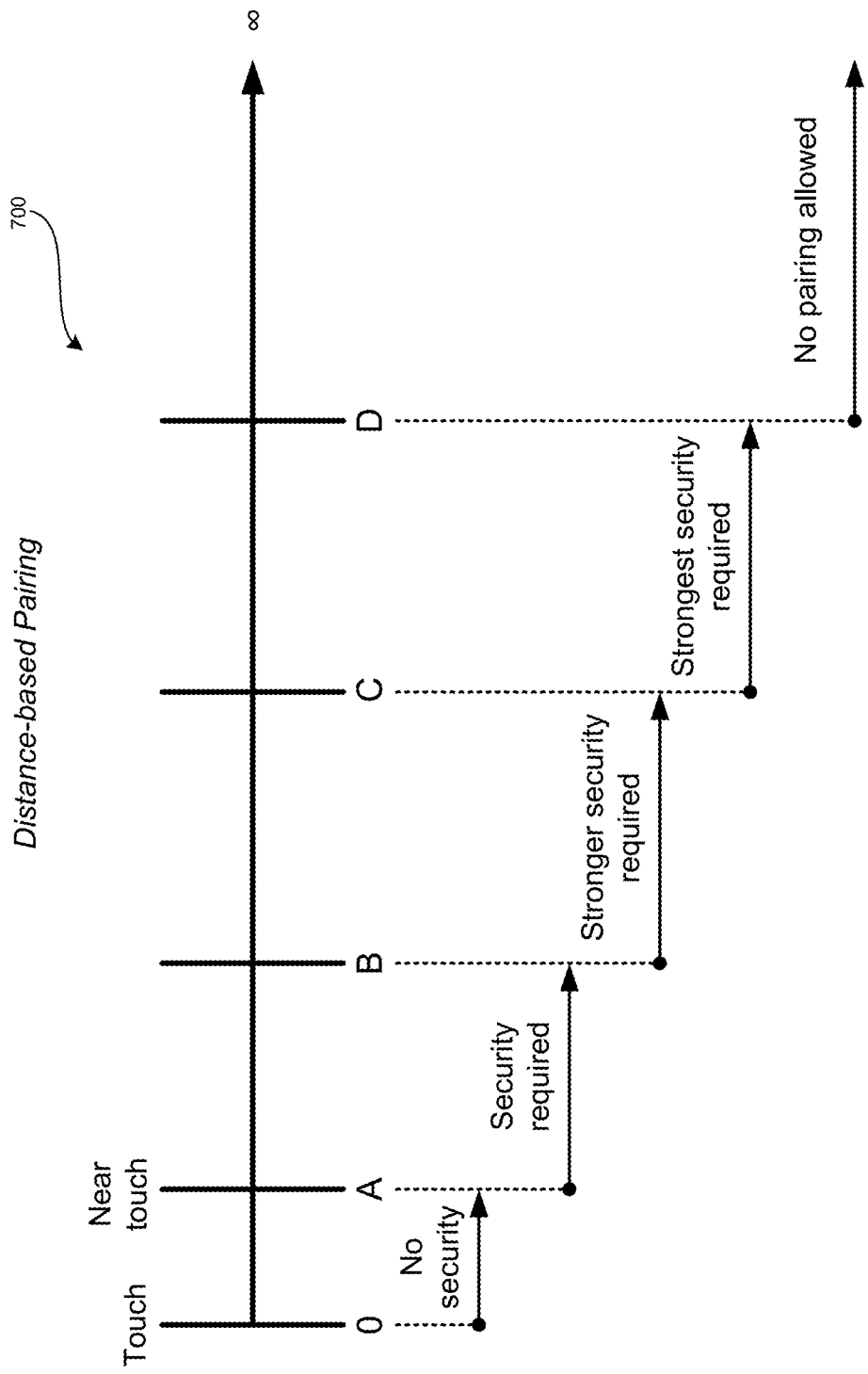
FIG. 7 a flow chart illustrating exemplary distance-based pairing of devices, such as BNC/FSC devices for example, in accordance with an exemplary embodiment of the invention.

FIG. 7 a flow chart illustrating exemplary distance-based pairing of devices, such as BNC/FSC devices, for example, in accordance with an exemplary embodiment of the invention. Referring to FIG. 7, there is shown a distance-based pairing 700. In various exemplary embodiments of the inventions, a sliding scale may be utilized for secured pairing of BNC/FSC enabled devices such as a BNC/FSC dongle.

The two BNC/FSC enabled devices that are to be paired may be placed very close to each other and their power may be controlled to the point where they may just hear each other and thus may not be heard by any other listening device. At that point, security information such as keys may be exchanged and the two devices paired using full spectrum capture. In an exemplary embodiment of the invention, depending on distance between the two BNC/FSC enabled devices, different levels of security may be applied for pairing. In this regard, pairing may occur at varying distances. The closer together the two BNC/FSC enabled devices are, the lesser the security that is needed. On the other hand, the further apart two BNC/FSC enabled devices are, the greater the security that is needed for pairing. For example, if the two BNC/FSC enabled devices, between 0 and A, are touching or near touching, then no security request is needed. In other words, users of the two BNC/FSC enabled devices do not care whether the content is communicated without security, so long as the communication occurs and/or occurs within a certain range (between 0 and A).

If the two BNC/FSC enabled devices, between A and B, are near touching, then a first security scheme may be utilized. If the two BNC/FSC enabled devices are between B and C, 5 cm apart, for example, a second security scheme may be utilized, where the second security scheme may be stronger than the first security scheme. If the two BNC/FSC enabled devices are between B and C, 20 cm apart, for example, a third security scheme may be utilized, where the third security scheme may be stronger than the second and the first security schemes. If the two BNC/FSC enabled devices are beyond D, greater than 100 cm, for example, no pairing may be allowed.

A security scheme may comprise data categories that may be communicated between the two BNC/FSC enabled devices. In an exemplary embodiment of the invention, the two BNC/FSC enabled devices may be operable to communicate secure data only when the two BNC/FSC enabled devices are located at a certain distance. For example, the two BNC/FSC enabled devices may only communicate data when they are located at one meter or less apart. If the two BNC/FSC enabled devices are located at a distance greater than one meter, they may communicate only non-secure data. If the two BNC/FSC enabled devices are located more than 2 meters apart, then they may not communicate at all. Those two BNC/FSC enabled devices may only know the channel between the two BNC/FSC enabled devices and both devices share the same spectrum.

Another exemplary embodiment of the invention may also provide a layered approach for data communication between the two BNC/FSC enabled devices. In this regard, data may be assigned to a particular layer and only data that is in a particular layer may be communicated based on the distance. A data type may specify what kind of data is in each particular layer. For example, secure data in layer 1 may only be communicated when both devices are less than ½ meter apart. Non-secure data in layer 2 may only be communicated in instances when both devices are less than or equal to 1.5 meters apart. Non-secure data in layer 3 may only be communicated in instances when both devices are less than or equal to 2 meters apart. Non-secure data in layer 4 may only be communicated in instances when both devices are less than or equal to 2.0 meters apart, and so on.

Devices may be identified by, for example, MAC addresses. If a known or trusted device is within a certain range, then communication may be permitted with little or no security based on the device identity. However, once the trusted device is out of range, then security may be required to facilitate communication. For example, a successful challenge may be required for communication to occur.

Figure 8:
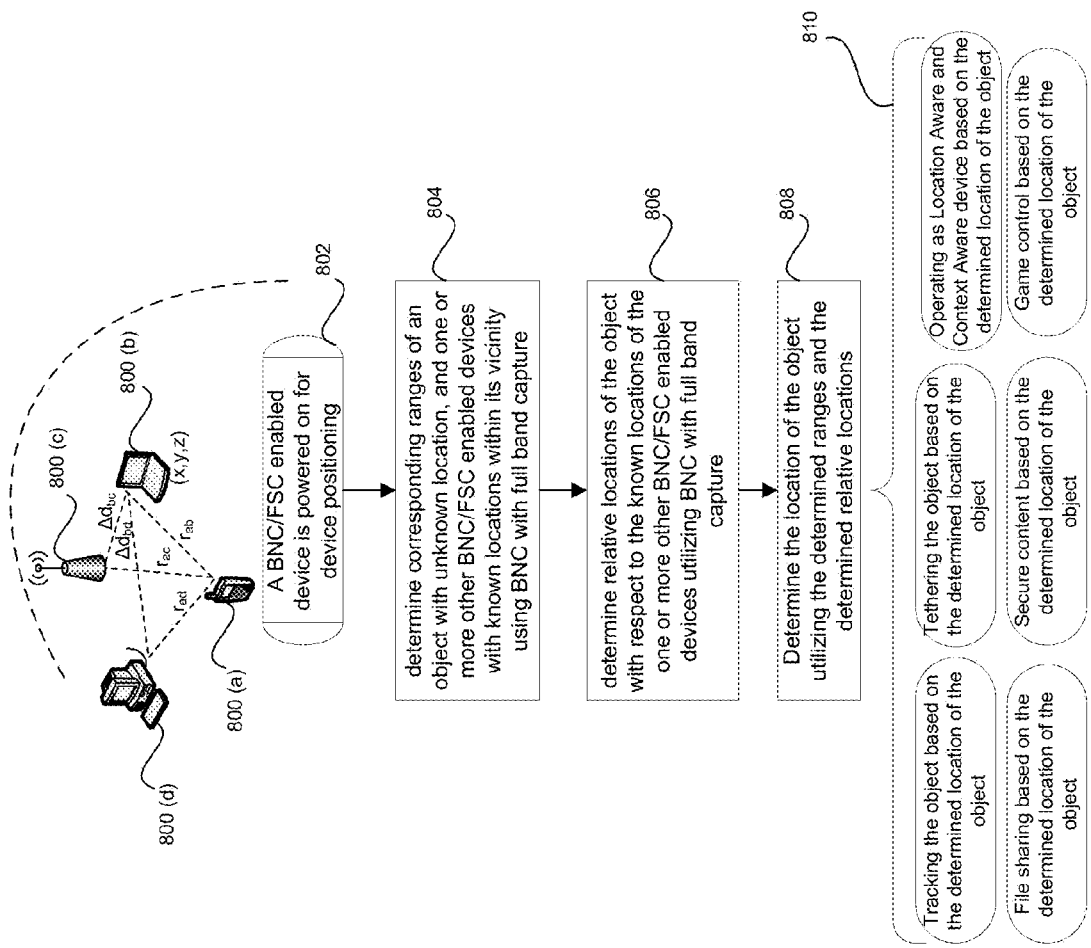
FIG. 8 is a flow diagram that illustrates exemplary steps for positioning an object using, for example, Broadband Near-Field Communication (BNC) with full spectrum capture (FSC), in accordance with an exemplary embodiment of the invention.

FIG. 8 is a flow diagram that illustrates exemplary steps for positioning an object using, for example, Broadband Near-Field Communication (BNC) with full spectrum capture (FSC), in accordance with an exemplary embodiment of the invention. Referring to FIG. 8, in step 802, a BNC/FSC enabled device 800(a) is powered on to determine the position of an object, for example, a BNC/FSC enabled device 800(b), within its vicinity. Also, within the vicinity of the BNC/FSC enabled device 800(a), there may be one or more other BNC/FSC enabled devices with known positions. The one or more other BNC/FSC enabled devices may comprise access points (APs), RFID tags, and other BNC/FSC enabled devices within the vicinity of the BNC/FSC enabled device 800(a). In an exemplary embodiment of the invention, hybrid BNC/FSC solutions may be utilized to give or provide a more precise location of an object without relying on received signal strength. A duty cycle burst of low power energy over a large bandwidth may be utilized to determine the range or position of an object or person. In this regard, the hybrid BNC/FSC solutions may be utilized to tell whether an object may have been moved from its current location by, for example, 2 centimeters. This distance may vary based on the BNC/FSC configuration. This may be utilized to track, for example, high value items including laptops, personal effects, assets and so on. Persons may also be tracked in a similar manner.

A BNC/FSC enabled device 800(a) may possess the capability to communicate with a plurality of other BNC/FSC enabled devices 800(b), 800(c) and 800(d) within the vicinity. In this regard, a stolen laptop or tablet with BNC/FSC capability may be operable to send an alert or distress signal to any of a plurality of neighboring devices. The alert of distress signal may comprise a location of the devices. Accordingly, the stolen laptop or tablet may be traced and recovered using any of a plurality of location determining mechanisms such as relative position with respect to other devices with known locations, for example, access points (APs), RFID tags, and other BNC/FSC devices, with known location such as from an integrated GPS or location based on triangulation. A BNC/FSC enabled device may function as an indoor positioning device.

The exemplary steps start in step 804, where the BNC/FSC enabled device 800(a) may be operable to perform ranging to determine corresponding ranges of the BNC/FSC enabled device 800(b), and the one or more other BNC capable devices with known positions using BNC links with full spectrum capture. For example, parameters $r_{ab}$, $r_{ac}$, and $r_{ad}$ may represent the determined ranges for the BNC/FSC enabled devices 800(b), 800(c) and 800(d) with respect to the BNC/FSC enabled device 800(a), respectively.

In step 806, the BNC/FSC enabled device 800(a) may determine relative locations of the object (the BNC/FSC enabled device 800(b)) with respect to the known locations of the one or more other BNC/FSC enabled devices 800(c) and 800(d) utilizing BNC with full spectrum capture. In step 808, the BNC/FSC enabled device 800(a) may determine the location of the object (the BNC/FSC enabled device 800(b)) utilizing the determined ranges and the determined relative locations. In step 810, the BNC/FSC enabled device 800(a) may utilize the determined location of the object to support various use cases such as track the object (the BNC/FSC enabled device 800(b)) based on the determined location of the object.

In an exemplary embodiment of the invention, a BNC/FSC device may also tether itself to a fixed device such as a fixed access point and as a user of the BNC/FSC device walks through a mall or store, location may be determined. As soon as some distance is exceeded, then an alarm or alert may be initiated by an application running on a smartphone or tablet. As the BNC/FSC device moves away and the tether is broken, a new tether maybe formed with another device. This may be utilized to track, for example, criminals, child molesters, and predators, as they move around. GPS or other GNSS technology may also be utilized to pinpoint location as movement is being tracked.

In an exemplary embodiment of the invention, an open tether may be utilized to enable in-building navigation of humans and/or objects. The speed and/or velocity of the BNC/FSC device may also be used to determine its location or relative location with respect to other devices. The Doppler from other surrounding sources may be utilized to determine the velocity.

A BNC/FSC device may operate as a location aware and context aware device. In an exemplary embodiment of the invention, BNC/FSC devices may be operable to sense the environment. A map of BNC/FSC devices within a particular area may be generated and displayed. The map may be part of an application that is displayed on smartphones or tablets. For example, kids may view the map to determine which ones of their friends may be at the mall. A BNC/FSC device may be able to determine whether it is in a room, such as an office, as opposed to being in an auditorium. This information may be combined with GPS information to provide a more precise determination of the environment. The BNC/FSC device may be scaled based on the type of application and also based on the perimeter and surroundings where it is located.

In an exemplary embodiment of the invention, a file may be shared with conference participants in a conference room. The file may be opened and viewed by every participant in the room. However, if a participant leaves the conference room, then a lock is placed on the document and the document may no longer be viewed. If that participant re-enters the room, the document will again be viewable.

With a sufficiently high SNR, location may be resolved within a fraction of a wavelength, which translates to within a foot or less at 1 GHz.

In one exemplary embodiment of the invention, two BNC/FSC devices may be electronically tethered. The moment one of the devices moves out of a certain range of the other device, authentication or re-authentication may be required. The level of authentication required may vary depending of the distance of the two devices.

In an exemplary embodiment of the invention, user A is streaming a movie from their smartphone to a HD TV using BNC/FSC. User A's kids are currently watching this movie on the HD TV. User A gets up to take a call on the smartphone and starts moving away from the HD TV. As user A moves away from the HD TV, the bandwidth for the connection may decrease and the quality of the movie may start to deteriorate. User A may reach a point where a security issue arises because an unauthorized device may be able to pick up the streamed movie signal. When this occurs, the link may be dropped or user A may be requested to re-authenticate using a stronger key.

Wireless tethering may be provided for objects and/or persons. In this regard, BNC/FSC may enable the location of objects, animals and persons. For example, BNC/FSC may be utilized to determine whether a child is out of range without the need to measure and compare received signal strength. For devices, while they are tethered, there may be no need to authenticate. However, once the tether is broken, authentication may automatically be required.

In an exemplary embodiment of the invention, BNC/FSC devices may be used as a gaming controller since the resolution in position may be adjusted with fair accuracy. For example, three (3) BNC/FSC devices may be utilized and triangulation may be utilized to determine a position of a person or a body part such as a hand relative to the BNC/FSC devices. BNC/FSC sensors may also be place on the gamer's body to aid in more accurately determining the location of a person or the person's hand, for example.

Accelerometer and/or gyroscope information for devices may be shared among a plurality of BNC/FSC devices and utilized to assist with the gaming control or other interactive events. Limiting the number of participants to a communication session may provide additional security. For example, the number of participants may be limited to 5 and if a 6th person enters the room, connection is denied.

In various exemplary aspects of the method and system for broadband near-field communication utilizing full spectrum capture, a communication device such as the BNC/FSC enabled device 200 may comprise an integrated BNC/FSC transceiver 210 operating in a frequency spectrum band. The BNC/FSC enabled device 200 may be operable to detect usable channels within the entire frequency spectrum band. The BNC/FSC transceiver 210 may utilize one or more of the detected channels to wirelessly communicate multimedia content with one or more other BNC enabled devices such as the BNC/FSC enabled devices 110(a)-110(c). In an exemplary embodiment of the invention, the BNC/FSC enabled device 200 may be operable to pair with the BNC/FSC enabled devices 110(a)-110(c) utilizing BNC protocols. In this regard, the BNC/FSC transceiver 210 may be configured with various security levels during the pairing, as illustrated in FIG. 8. The security levels may be determined based on corresponding distances between the BNC/FSC transceiver 210 and the BNC/FSC enabled devices 110(a)-110(c). The BNC/FSC transceiver 210 may utilize the determined security levels to communicate the multimedia content with the BNC/FSC enabled devices 110(a)-110(c). Depending on device capabilities, the BNC/FSC enabled device 200 may support other wireless communication protocols such as Bluetooth, WiFi, ZigBee, and WiMAX. In some instances, the Bluetooth transceiver 220 may need to pair with the Bluetooth and BNC capable devices 110(a)-110(c), for example. In this regard, the BNC/FSC transceiver 210 may be enabled to exchange authentication information over an BNC link so as to expertise pairing the Bluetooth transceiver 220 with other Bluetooth and BNC capable devices 110(a)-110(c). After the BNC based pairing, the BNC/FSC enabled device 200 may utilize Bluetooth protocols via the Bluetooth transceiver 220 to communicate multimedia content with other Bluetooth and BNC capable devices 110(a)-110(c). In an exemplary embodiment of the invention, the BNC/FSC enabled device 200 may be configured to share the multimedia content with other BNC/FSC enabled devices 110(a)-110(c). For example, when a BNC/FSC device 110(a) is within certain proximity of the BNC/FSC device 200, the BNC/FSC device 200 may share its display with the BNC/FSC device 110(a) such that the two BNC/FSC enabled devices 200 and 110(a) may share and display the same multimedia content.

The BNC/FSC enabled devices 200 and 110(a)-110(c) may be configured to utilize full spectrum capture in order to detect usable channels and aggregate the usable channels to increase channel bandwidth for the data transmission. In one exemplary embodiment of the invention, for transmission, the data transmission may be carried or transmitted over a single detected channel within the operating frequency spectrum band. However, for reception, multiple reference elements or signals such as pilot signals may be utilized to determine or detect which of channels in the operating frequency spectrum band may be indeed usable.

In order to receive signals from the BNC/FSC enabled devices 110(a)-110(c), the BNC/FSC enabled device 200 may be operable to establish synchronization with the BNC/FSC enabled devices 110(a)-110(c). In this regard, the BNC/FSC enabled device 200 may be configured to utilize unlicensed bands to establish synchronization. In other words, synchronization information may also be provided in an unlicensed band, such as the cordless region 450, for example, between 917 MHz and 950 MHz. The BNC/FSC enabled device 200 may look into this region of the frequency spectrum band to find synchronization information.

In exemplary embodiment of the invention, the BNC/FSC transceiver 210 may be utilized to provide a more precise location of an object such as the BNC/FSC enabled device 110(a). In this regard, the BNC/FSC transceiver 210 may perform ranging to determine corresponding ranges of the BNC/FSC enabled device 110(a), and the one or more other BNC capable devices with known positions such as the BNC/FSC enabled devices 110(b)-110(c) using BNC links with full spectrum capture. The BNC/FSC enabled device 200 may determine relative locations of the object (the BNC/FSC enabled device 110(a)) with respect to the known locations of the one or more other BNC/FSC enabled devices 110(b) and 110(c) utilizing BNC with full spectrum capture. The BNC/FSC enabled device 200 may determine the location of the object (the BNC/FSC enabled device 110(a)) utilizing the determined ranges and the determined relative locations.

Figure 9:
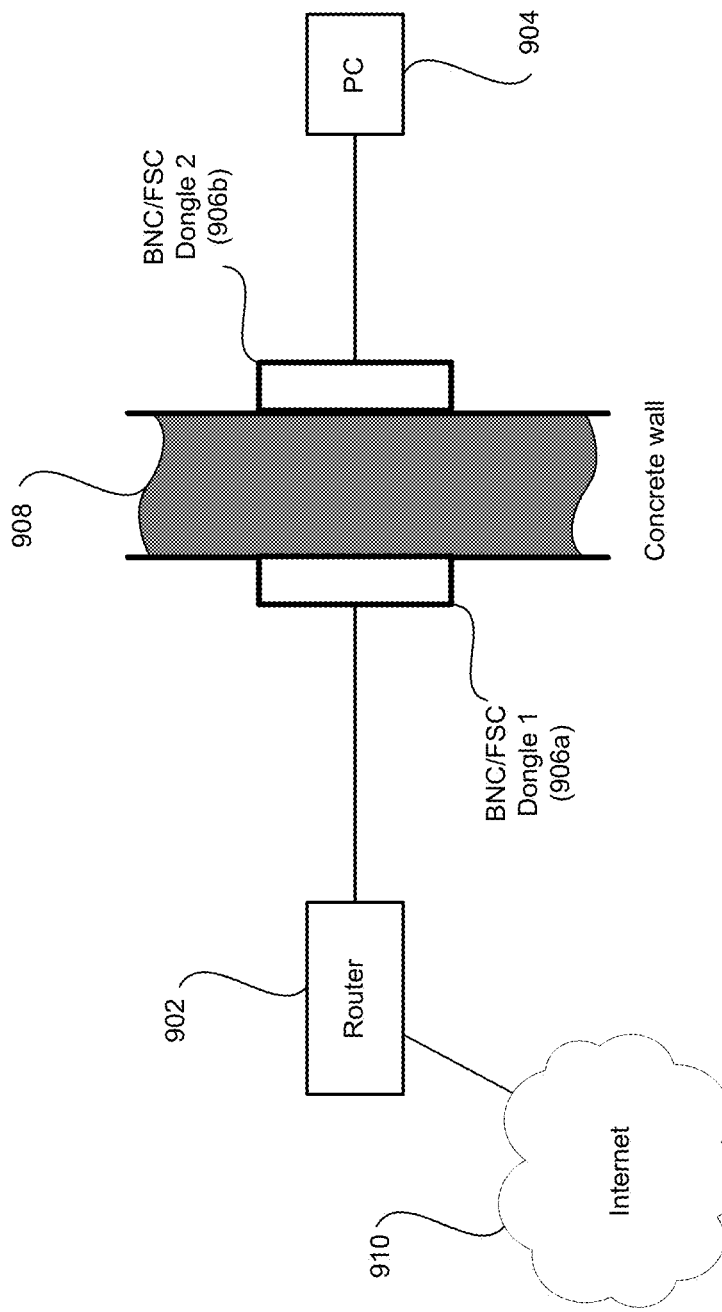
FIG. 9 is a block diagram that illustrates a dongle, such as a BNC/FSC dongle for example, in accordance with an exemplary embodiment of the invention.

FIG. 9 is a block diagram that illustrates a dongle, such as a BNC/FSC dongle for example, in accordance with an exemplary embodiment of the invention. Referring to FIG. 9, there is shown a router 902, a PC 904, two BNC/FSC dongles, namely dongle 1 (906a) and dongle 2 (906b), a dwelling wall 908 and the Internet 910.

As shown in FIG. 9, the BNC/FSC dongle 1 (906a) is communicatively coupled to a port such as an Ethernet port or MoCA port of the router 902. The router 902 may be coupled to the Internet 910. The BNC/FSC dongle 2 (906b) is communicatively coupled to, for example, an Ethernet port or MoCA port of the PC 904. The BNC/FSC dongle 1 (906a) is placed adjacent to the BNC/FSC dongle 2 (906b) on an opposite side of the dwelling wall 908. There is no wired connection existing through the wall between the BNC/FSC dongle 1 (906a) and the BNC/FSC dongle 2 (906b). The BNC/FSC dongle 1 (906a) may be referred to as a first broadband wireless device and the BNC/FSC dongle 2 (906b) may be referred to as a second broadband wireless device.

The router 902 may comprise suitable logic circuitry interfaces and/or code that may be operable to route signals from one or more ingress ports to one or more egress ports. For example, the router 902 may be operable to route signals received from the BNC/FSC dongle 1 (906a) to the Internet 910 and to route signals received from the Internet 910 to the BNC/FSC dongle 1 (906a). The router 902 may comprise a wireless and/or wired interface. The wireless interface may comprise a Wireless LAN (802.11 a, b, g, e, n), Bluetooth or other interface. The wired interface may comprise a MoCA, Ethernet or other interface. In one exemplary embodiment of the invention, the connection between the router 902 and the BNC/FSC dongle 1 (906a) may utilize the wireless interface such as 802.11 a, b, g, e, n. In another exemplary embodiment of the invention, the connection between the router 902 and the BNC/FSC dongle 1 (906a) may utilize the wired interface such as Ethernet.

The PC 904 may comprise suitable logic circuitry interfaces and/or code that may be operable to provide personal computing and communication services. For example, the PC 904 may be utilized to surf the Internet, which may be accessible via the router 902 and a BNC/FSC connection between the BNC/FSC dongle 1 (906a) and the BNC/FSC dongle 2 (906b). The PC 904 may comprise a wired and/or wireless interface. The wireless interface may comprise a Wireless LAN (802.11 a, b, g, e, n), Bluetooth or other interface. The wired interface may comprise a MoCA, Ethernet or other interface. In one exemplary embodiment of the invention, the connection between the PC 904 and the BNC/FSC dongle 2 (906b) may utilize the wireless interface such as 802.11 a, b, g, e, n. In another exemplary embodiment of the invention, the connection between the PC 904 and the BNC/FSC dongle 2 (906b) may utilize the wired interface such as Ethernet.

The dwelling wall 908 may comprise a barrier or support structure for a building such as a home or office. The dwelling wall may be made of wood, concrete gypsum, composite, and/or other material that may be utilized for building walls.

Each of the two BNC/FSC dongles 906a, 906b may comprise suitable logic circuitry interfaces and/or code that may be operable to utilize broadband near-field communication with full spectrum capture (BNC/FSC) to communicate with each other across a barrier such as the dwelling wall 908. Each of the BNC/FSC dongles 906a, 909b may be substantially similar to the BNC/FSC dongle 260, which is illustrated in FIG. 2B. One or both of the two BNC/FSC dongles 906a, 906b may comprise an alignment/positioning module 269 that may be operable to provide alignment of the two BNC/FSC dongles 906a, 906b when they are affixed to a barrier such as the dwelling wall 908. Proper alignment of the two BNC/FSC dongles 906a, 906b ensures optimal communication between the two BNC/FSC dongles 906a, 906b.

In accordance with an exemplary embodiment of the invention, the alignment/positioning module 269 within one or both of the BNC/FSC dongles 906a, 906b may comprise circuitry and code that may be operable to provide proper or optimal alignment of two BNC/FSC dongles 906a, 906b when they are placed on opposites sides of the barrier such as the dwelling wall 908. In this regard, test signals may be transmitted by one or both of the BNC/FSC dongles 906a, 906b and received in order to determine when the corresponding BNC/FSC dongle is aligned to provide optimal communication between the two BNC/FSC dongles 906a, 906b. LEDs, beeps, audio or other alerting or display mechanisms may be utilized to provide alignment cues and to indicate when the BNC/FSC dongle 1 (906a) is properly aligned with the BNC/FSC dongle 2 (906b). Visual alignment cues may be provided by the LED/LCD module 269b and audio alignment cues may be provided by the speaker 269c.

One method aligning the two paired dongles such as the BNC/FSC dongles 906a, 906b is to place one of the BNC/FSCs dongles in a fixed position and then move the other BNC/FSC dongle so as to achieve optimal alignment. A visual and/or audible alert may be generated to indicate when the optimal alignment occurs. One exemplary visual alert may comprise a series of 5 LED lights arranged as a bar. Whenever all 5 LED lights are lit, this may indicate that optimal alignment is achieved and signals are being communicated between the two BNC/FSC dongles 906a, 906b in an efficient manner at maximum throughput. In instances when less than 5 LED lights are lit, then the alignment of the two dongles are less than optimal, and a better position exists for aligning both of the BNC/FSC dongles 906a, 906b. As an increasing number of LED lights are lit, then this provides an indication that the two BNC/FSC dongles 906a, 906b are being moved towards a position that is approaching the optimal alignment position.

Another exemplary visual alert may comprise a LED/LCD counter that may be operable to display a count of 1 to 10. Whenever the LED/LCD counter displays a value of 10, this may indicate that optimal alignment is achieved and signals are being communicated between the two BNC/FSC dongles 906a, 906b in an efficient manner at maximum throughput. In instances when the LED/LCD counter displays a value of less than 10, then the alignment of the two dongles are less than optimal, and a better position exists for aligning both of the BNC/FSC dongles 906a, 906b. As the count value on the LED/LCD counter increases, then this provides an indication that the two BNC/FSC dongles 906a, 906b are being moved towards a position that is approaching the optimal alignment position.

One exemplary audio alert may comprise a series of beeps and a solid tone. Whenever a solid tone occurs, this may indicate that optimal alignment is achieved and signals are being communicated between the two BNC/FSC dongles 906a, 906b in an efficient manner at maximum throughput. In instances when beeps may occur a slow rate, then the alignment of the two dongles are less than optimal, and a better position exists for aligning both of the BNC/FSC dongles 906a, 906b. As an increasing number of beeps are generated, then this provides an indication that the two BNC/FSC dongles 906a, 906b are being moved towards a position that is approaching the optimal alignment position.

One exemplary audio alert may comprise a voice command that specified the direction in which to move one of the BNC/FSC dongles in order to provide optimal alignment. For example, the voice command may indicate "move left," "move right," "move up," "move down," and "devices a now aligned."

Figure 10:
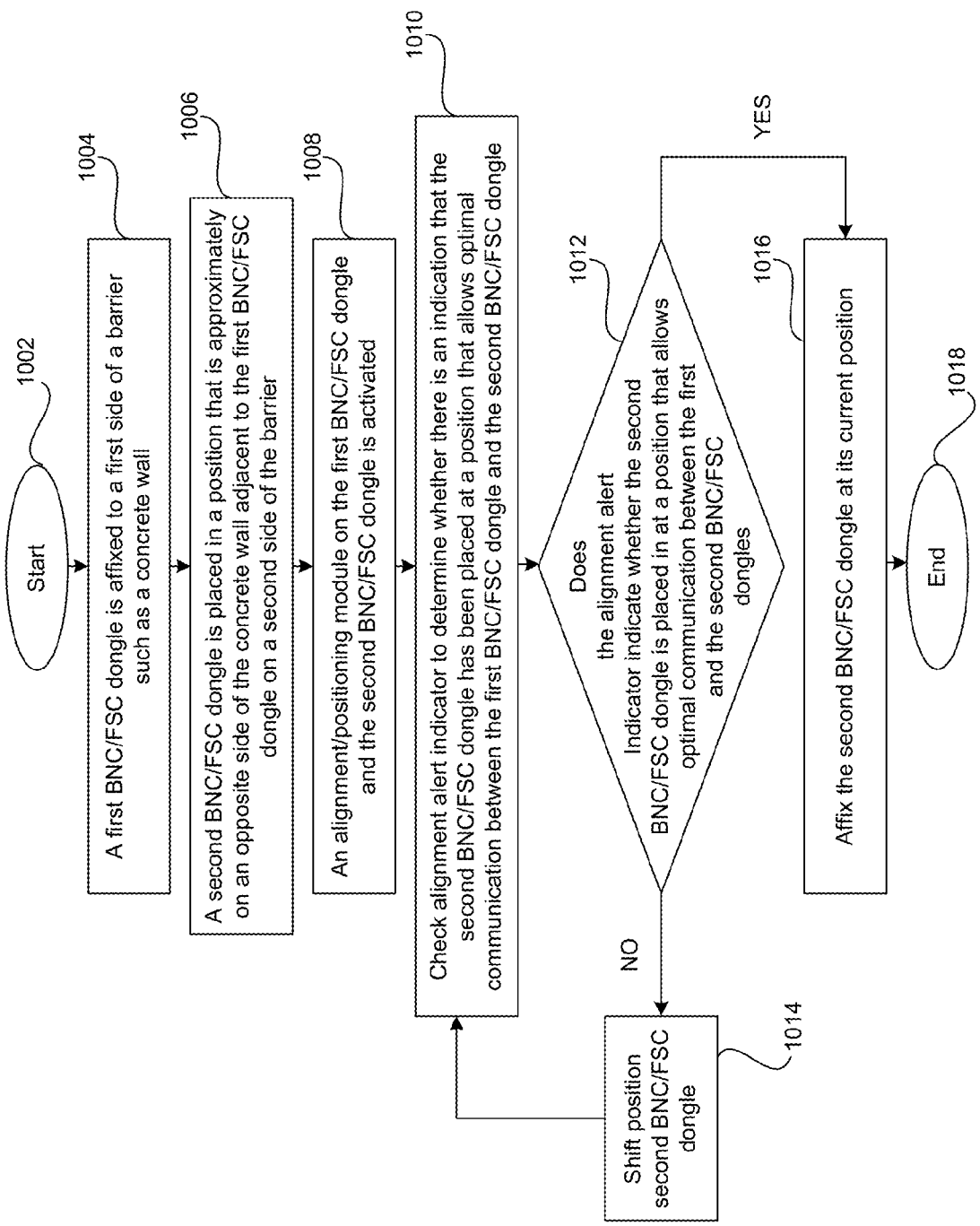
FIG. 10 is a flow chart illustrating exemplary steps for optimally installing two companion dongles, such as BNC/FSC dongles for example, in accordance with an exemplary embodiment of the invention.

FIG. 10 is a flow chart illustrating exemplary steps for optimally installing two companion dongles, such as BNC/FSC dongles for example, in accordance with an exemplary embodiment of the invention. Referring to FIG. 10, the exemplary steps start at step 1002. In step 1004, a first BNC/FSC dongle 906a is affixed to a first side of a barrier such as the dwelling wall 908. In step 1006, a second BNC/FSC dongle 906b is placed in a position that is approximately on an opposite side of the concrete wall adjacent to the first BNC/FSC dongle 906a on a second side of the barrier. In step 1008, an alignment/positioning module 269 on the first BNC/FSC dongle 906a and on the second BNC/FSC dongle 906b is activated. In step 1010, an alignment alert indicator may be checked to determine whether there is an indication that the second BNC/FSC dongle 906b has been placed at a position that allows optimal communication between the first BNC/FSC dongle 906a and the second BNC/FSC dongle 906b.

In step 1012, based on the alignment alert indicator, it may be determined, whether the second BNC/FSC dongle 906b is placed at a position that allows optimal communication between the second and the first BNC/FSC dongles 906b, 906a, respectively. If the alignment alert indicator indicates that the two BNC/FSC dongles 906a, 906b have not been placed in a position that allows optimal communication between the two BNC/FSC dongles 906a, 906b, then in step 1014, the second BNC/FSC dongle 906b may be shifted to another position. Control then returns to step 1010, where the alignment alert indicator may be checked to determine whether there is an indication that the second BNC/FSC dongle 906b has been placed at a position that allows optimal communication between the first BNC/FSC dongle 906a and the second BNC/FSC dongle 906b.

If the alignment alert indicator indicates that the two BNC/FSC dongles 906a, 906b have been placed in a position that allows optimal communication between the two BNC/FSC dongles 906a, 906b, then in step 1016, the second BNC/FSC dongle 906b may be affixed at its current position to the barrier such as the dwelling wall 908. The exemplary steps may end at step 1018.

In accordance with an exemplary embodiment of the invention, an application running on a Smartphone may be utilized to align the first BNC/FSC dongle 906a with the second BNC/FSC dongle 906b. In this regard, the first BNC/FSC dongle 906a and the second BNC/FSC dongle 906b may operable to wirelessly communicate with the Smartphone utilizing, for example, Bluetooth or WiFi. The Smartphone may be operable to receive alignment information from one or both of the first BNC/FSC dongle 906a and the second BNC/FSC dongle 906b update an audio and/or graphical user interface that may provide corresponding audio and/or visual cues for alignment.

Figure 11A:
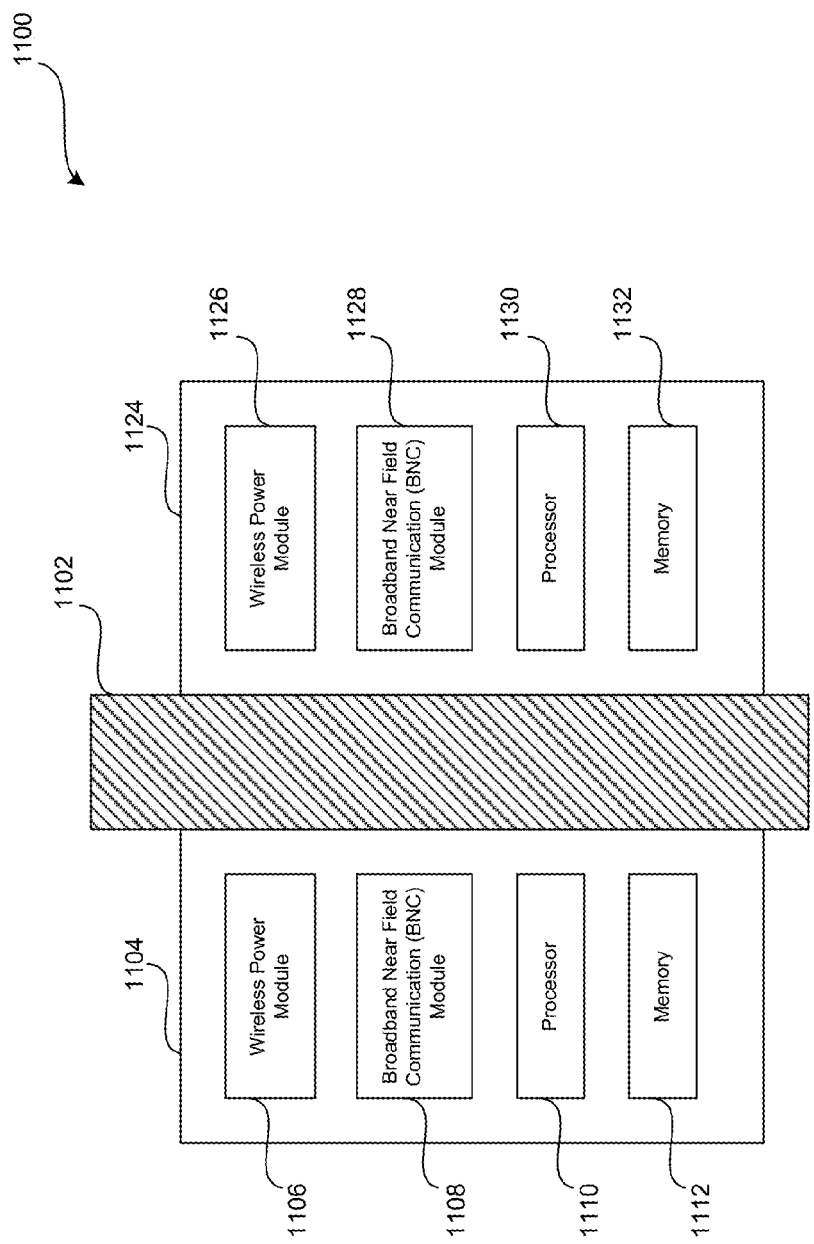
FIG. 11A is a block diagram that illustrates an exemplary embodiment of a integrated module that provides wireless power communication, such as broadband near-field communication (BNC) for example, in accordance with an exemplary embodiment of the invention.

FIG. 11A is a block diagram that illustrates an exemplary embodiment of a integrated module that provides wireless power communication, such as broadband near-field communication (BNC) for example, in accordance with an exemplary embodiment of the invention. Referring to FIG. 11A, the system 1100 comprises a dwelling wall 1102, a first integrated wireless power and BNC module 1104 and a second integrated wireless power and BNC module 1124. The first integrated wireless power and BNC module 1104 comprises a wireless power module 1106, a BNC module 1108, a processor 1110 and memory 1112. The second integrated wireless power and BNC module 1124 comprises a wireless power module 1126, a BNC module 1128, a processor 1130 and memory 1132. In accordance with an exemplary embodiment of the invention, the first integrated wireless power and BNC module 1104 may comprise a first dongle and the second integrated wireless power and BNC module 1124 may also comprise a dongle. In this regard, both dongles may be paired utilizing the exemplary steps described in FIG. 6.

The dwelling wall 1100 may be made of wood, concrete gypsum, composite, and/or other material that may be utilized for building walls. The dwelling wall may be a roof or wall of a house on which, for example, a satellite dish, IPLNB, femtocell, picocell and/or other outdoor wireless communication device the requires power is mounted.

The wireless power module 1106 may comprise suitable logic, circuitry, interfaces and/or code that may be operable to provide wireless power. In an exemplary embodiment of the invention, the wireless power module 1106 may be operable to provide wireless power through magnetic induction and/or through resonant coupling. U.S. application Ser. No. 13/726,994, entitled "Method and/or System for Broadband Near-Field Communication (BNC) Utilizing Full Spectrum Capture (FSC) Supporting Concurrent Charging and Communication," provides an exemplary method and system for providing wireless powerless power. The Wireless Power Consortium (WPC) also provides various standards for providing wireless power, which may be utilized in various embodiments of the instant invention.

The BNC module 1108 may comprise suitable logic, circuitry, interfaces and/or code that may be operable to provide broadband near-field communication to enable wireless communication across a barrier such as a wall. In an exemplary embodiment of the invention, the BNC module 1108 may be substantially similar to the BNC/FSC dongle 260 of FIG. 2.

The processor 1110 may comprise suitable logic, circuitry, interfaces and/or code that may be operable to control the operation of the first integrated wireless power and BNC module 1104. In this regard, the processor 1110 may be operable to configure and control operation of the first integrated wireless power and BNC module 1104. For example, the processor 1110 may be operable to control pairing of the first integrated wireless power and BNC module 1104 with the second integrated wireless power and BNC module 1124. The processor 1110 may also be operable to control aligning of the first integrated wireless power and BNC module 1104 with the second integrated wireless power and BNC module 1124.

The memory 1112 may comprise suitable logic, circuitry, interfaces and/or code that may be operable to store configuration data, operating data, instructions and/or code that may be utilized by the first integrated wireless power and BNC module 1104.

The wireless power module 1126 may comprise suitable logic, circuitry, interfaces and/or code that may be operable to provide wireless power. In an exemplary embodiment of the invention, the wireless power module 1126 may be substantially similar to the wireless power module 1106.

The BNC module 1128 may comprise suitable logic, circuitry, interfaces and/or code that may be operable to provide broadband near-field communication to enable wireless communication across a barrier such as the dwelling wall 1102. In an exemplary embodiment of the invention, the BNC module 1128 may be substantially similar to the BNC module 1108.

The processor 1130 may comprise suitable logic, circuitry, interfaces and/or code that may be operable to control the operation of the second integrated wireless power and BNC module 1124. In this regard, the processor 1110 may be operable to configure and control operation of the second integrated wireless power and BNC module 1124. For example, the processor 1130 may be operable to control pairing of the first integrated wireless power and BNC module 1104 with the second integrated wireless power and BNC module 1124. The processor 1110 may also be operable to control aligning of the first integrated wireless power and BNC module 1104 with the second integrated wireless power and BNC module 1124. In this regards, the processor 1130 may be substantially similar to the processor 1110.

The memory 1132 may comprise suitable logic, circuitry, interfaces and/or code that may be operable to store configuration data, operating data, instructions and/or code that may be utilized by the second integrated wireless power and BNC module 1124. In this regard, the memory 1132 may be substantially similar to the memory 1112.

Prior to operation, the first integrated wireless power and BNC module 1104 may be paired with the second integrated wireless power and BNC module 1124. In this regard, the exemplary steps that are illustrated in FIG. 6 may be utilized to pair the first integrated wireless power and BNC module 1104 with the second integrated wireless power and BNC module 1124. Once the first integrated wireless power and BNC module 1104 has been paired with the second integrated wireless power and BNC module 1124, operation of the modules may begin. The first integrated wireless power and BNC module 1104 and the second integrated wireless power and BNC module 1124 may be located on opposite sides of the barrier such as the dwelling wall 1102. In an exemplary embodiment of the invention, the exemplary steps illustrated in FIG. 10 may be utilized to optimally align or position the first integrated wireless power and BNC module 1104 and the second integrated wireless power and BNC module 1124. Once the first integrated wireless power and BNC module

1104 has been paired and aligned with the second integrated wireless power and BNC module 1124, operation of the modules may begin.

In operation, the wireless power module 1106 may be utilized to wirelessly power the second integrated wireless power and BNC module 1124. For example, in instances where the first integrated wireless power and BNC module 1104 may be located within a home and the second integrated wireless power and BNC module 1124 may be located outside the home, the wireless power module 1106 may be utilized to wirelessly power the second integrated wireless power and BNC module 1124. In this scenario, the first integrated wireless power and BNC module 1104, which is located within the home, may be powered from, for example, an AC power outlet. Data or content may then be wirelessly communicated between the BNC module 1108 and the BNC module 1128.

In another example, in instances where the second integrated wireless power and BNC module 1124 may be located within a home and the first integrated wireless power and BNC module 1104 may be located outside the home, the wireless power module 1126 may be utilized to wirelessly power the first integrated wireless power and BNC module 1104. In both exemplary embodiments of the invention, there is no need to drill a hole in the dwelling wall 1102 to provide power to the module that is located external to the home. In this scenario, the second integrated wireless power and BNC module 1124, which is located within the home, may be powered from, for example, an AC power outlet. Data or content may then be wirelessly communicated between the BNC module 1108 and the BNC module 1128.

Figure 11B:
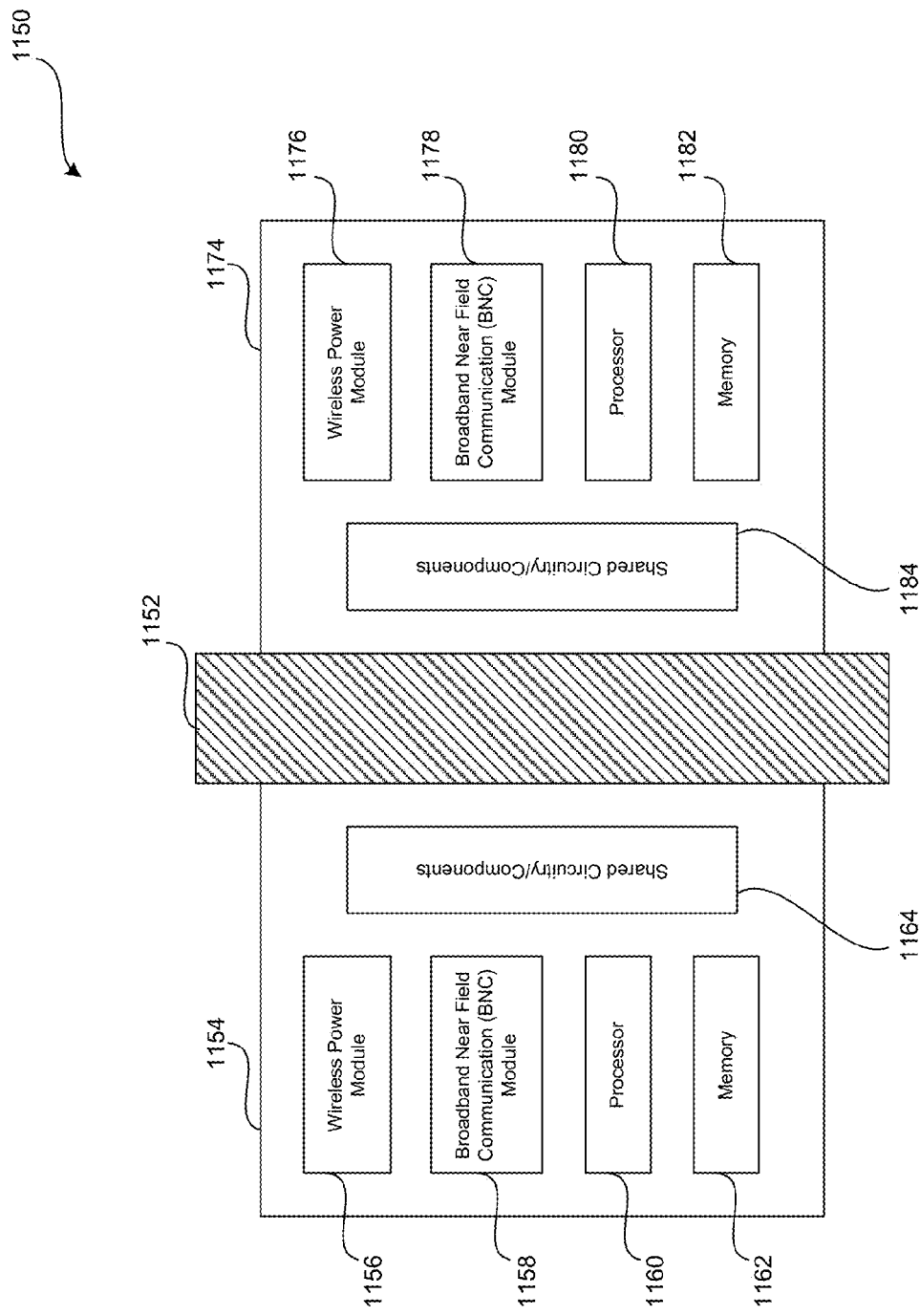
FIG. 11B is a block diagram that illustrates another exemplary embodiment of a integrated module that provides wireless power and communication, such as broadband near-field communication (BNC) for example, in accordance with an exemplary embodiment of the invention.

FIG. 11B is a block diagram that illustrates another exemplary embodiment of a integrated module that provides wireless power and communication, such as broadband near-field communication (BNC) for example, in accordance with an exemplary embodiment of the invention. Referring to FIG. 11B, the system 1150 comprises a dwelling wall 1152, a first integrated wireless power and BNC module 1154 and a second integrated wireless power and BNC module 1174. The first integrated wireless power and BNC module 1154 comprises a wireless power module 1156, a BNC module 1158, a processor 1160, memory 1162 and a shared circuitry/components module 1164. The second integrated wireless power and BNC module 1174 comprises a wireless power module 1176, a BNC module 1178, a processor 1180, memory 1182 and a shared circuitry/components module 1184.

In accordance with an exemplary embodiment of the invention, the first integrated wireless power and BNC module 1154 may comprise a first dongle and the second integrated wireless power and BNC module 1174 may also comprise a dongle. In this regard, both dongles may be paired utilizing the exemplary steps described in FIG. 6. In accordance with some exemplary embodiments of the invention, two or more of the modules comprising the first integrated wireless power and BNC module 1154 may be integrated on a single, die or package. Similarly, two or more of the modules comprising the second integrated wireless power and BNC module 1174 may be integrated on a single, die or package.

In accordance with an exemplary embodiment of the invention, the processor 1160 may be operable to determine which one of the paired first integrated wireless power and BNC module 1154 and the second integrated wireless power and BNC module 1174 is receiving power from an AC power source and automatically configure the remaining one of the first integrated wireless power and BNC module 1154 and the second integrated wireless power and BNC module 1174 to be powered wirelessly.

FIG. 11B is substantially similar to FIG. 11A, except that each of the first integrated wireless power and BNC module 1154 and the second integrated wireless power and BNC module 1174 comprise a shared circuitry/components module 1164, and 1184, respectively. In this regard, with respect to the first integrated wireless power and BNC module 1154, the shared circuitry/components module 1164 may comprise circuitry and/or components that may be shared by the wireless power module 1156 and the BNC module 1158. The shared circuitry/components module 1164 may comprise filters, coils, and/or RF component for example. Similarly with the respect to the second integrated wireless power and BNC module 1174, the shared circuitry/components module 1184 may comprise circuitry and/or components that may be shared by the wireless power module 1176 and the BNC module 1178. The shared circuitry/components module 1184 may comprise filters, coils, and/or RF components, for example.

In accordance with some exemplary embodiments of the invention, two or more of the modules comprising the first integrated wireless power and BNC module 1154 may be integrated on a single, die or package. Similarly, two or more of the modules comprising the second integrated wireless power and BNC module 1174 may be integrated on a single, die or package.

The configuration and operation of the first integrated wireless power and BNC module 1154 and the second integrated wireless power and BNC module 1174 are substantially similar. In this regard, the wireless power module 1156 may be utilized to wirelessly power the second integrated wireless power and BNC module 1174. For example, in instances where the first integrated wireless power and BNC module 1154 may be located and powered from within a home, and the second integrated wireless power and BNC module 1174 may be located outside the home, the wireless power module 1156 may be utilized to wirelessly power the second integrated wireless power and BNC module 1174. Similarly, in instances where the second integrated wireless power and BNC module 1174 may be located and powered from within a home, and the first integrated wireless power and BNC module 1154 may be located outside the home, the wireless power module 1176 may be utilized to wirelessly power the first integrated wireless power and BNC module 1154.

Figure 12:
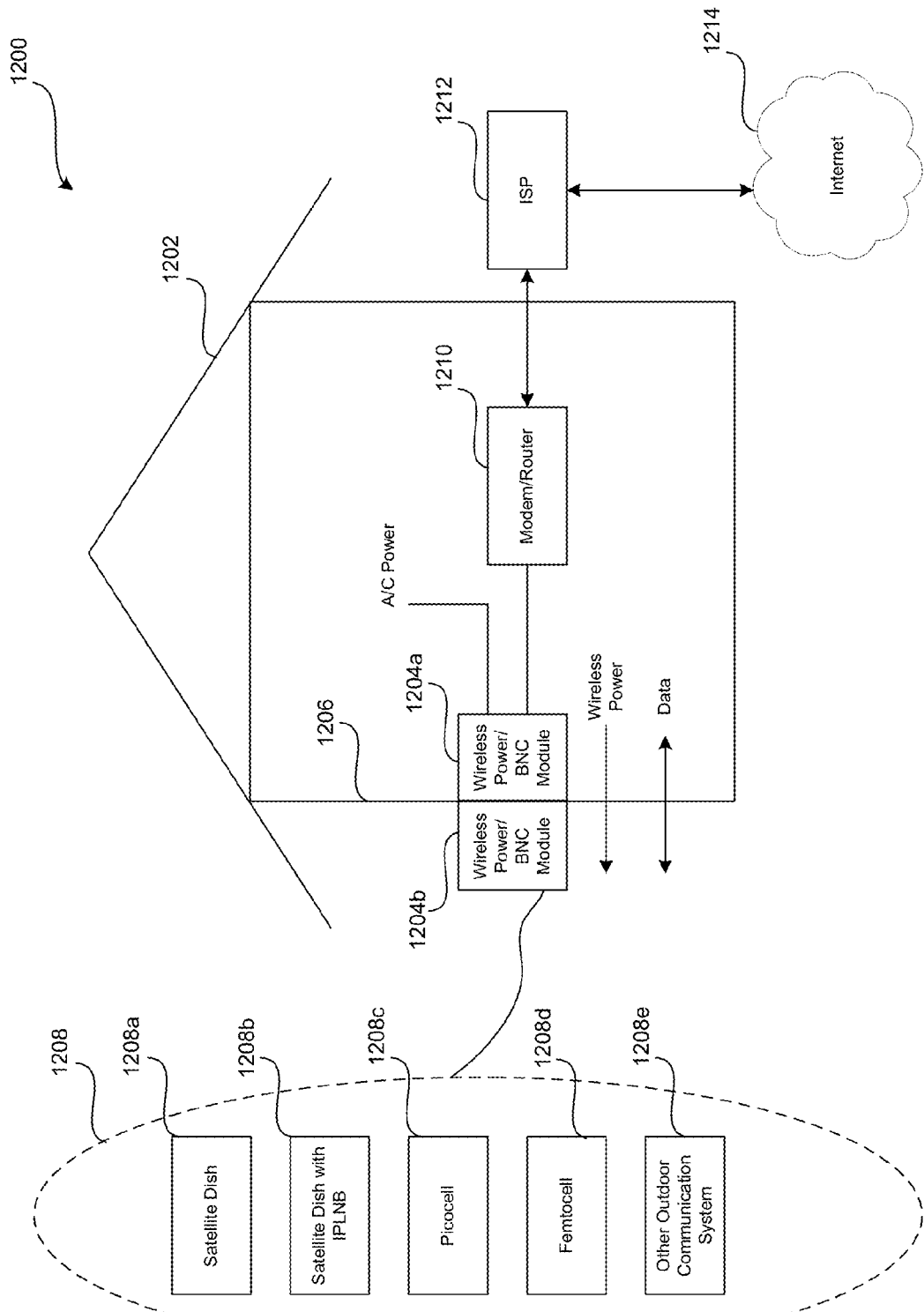
FIG. 12 is a diagram of an exemplary system that is operable to provide wireless power and communication, such as broadband near-field communication (BNC) for example, utilizing and integrated module, in accordance with an exemplary embodiment of the invention.

FIG. 12 is a diagram of an exemplary system that is operable to provide wireless power and communication, such as broadband near-field communication (BNC) for example, utilizing and integrated module, in accordance with an exemplary embodiment of the invention. Referring to FIG. 12, the exemplary system 1200 comprises a home 1202, a first integrated wireless power and BNC module 1204a, a second integrated wireless power and BNC module 1204b, dwelling wall 1206, a plurality of external communication devices that are collectively referenced as 1208, a modem/router 1210, an Internet service provider 1212 and the Internet 1214. The plurality of external communication devices 1208 comprises a satellite dish 1208a, a satellite dish with an IPLNB 1208b, a picocell 1208c, a femtocell 1208d, and other outdoor communication system 1208e.

Although the home 1202 is shown, the invention is not so limited. Accordingly, the invention may be applicable to any form of building, dwelling, housing or building such as an office or multi-dwelling unit.

The first integrated wireless power and BNC module 1204a and the second integrated wireless power and BNC module 1204b may comprise suitable logic, circuitry, interfaces and/or code that may be operable to provide and/or receive wireless power and also provide wireless communication across the dwelling wall 1206. The first integrated wireless power and BNC module 1204a and the second integrated wireless power and BNC module 1204b may be paired and positioned on opposite sides of the dwelling wall 1206. Each of the first integrated wireless power and BNC module 1204a and the second integrated wireless power and BNC module 1204b may be substantially similar to the first integrated wireless power and BNC module 1104 and the second integrated wireless power and BNC module 1124, which are respectively illustrated in FIG. 11A. The first integrated wireless power and BNC module 1204a is located within the home 1202, and is shown coupled to an AC power source within the home 1202. The second integrated wireless power and BNC module 1204b is located external to the home and is wirelessly powered by the wireless power module within the first integrated wireless power and BNC module 1204a.

The modem/router 1210 may provide backhaul to the Internet 1214 via the Internet service provider 1212. In this regard, the first integrated wireless power and BNC module 1204a and the second integrated wireless power and BNC module 1204b may communicate upstream data and downstream data via the modem/router 1210. Each of the plurality of external communication devices 1208, which comprises the satellite dish 1208a, the satellite dish with an IPLNB 1208b, the picocell 1208c, the femtocell 1208d, and the other outdoor communication system 1208e, and which are located external to the home, may be operable to backhaul traffic to the Internet. In this regard, the backhaul path may comprise the second integrated wireless power and BNC module 1204b, the first integrated wireless power and BNC module 1204a, the ISP 1212 and the Internet 1214.

The Internet service provider 1212 may be operable to provide Internet service to the home 1202.

The Internet 1214 may be operable to provide various web-based services and interconnectivity to a plurality of other devices and location.

The satellite dish 1208a may be operable to receive content bearing signals that are communicated from a satellite service. The content bearing signals are then communicated to the home 1202, where the signals are decoded to extract the corresponding content. The satellite dish 1208a may be located external to the house 1202 and is powered by the second integrated wireless power and BNC module 1204b.

The satellite dish with an IPLNB 1208b comprises an IP processing engine that is operable to generate and process IP packets at the LNB. U.S. application Ser. No. 13/687,676, entitled "Method and System for Monitoring, Management and Maintenance of an Internet Protocol LNB," discloses an exemplary IPLNB. The satellite dish with a IPLNB 1208b may be operable to communicate wireless signals over the air and backhaul traffic over the network in the home via the second integrated wireless power and BNC module 1204b and the first integrated wireless power and BNC module 1204a. The satellite dish with an IPLNB 1208b may also comprise one or more wireless transceivers such as a WLAN transceiver that may be operable to communicate with other satellite dishes with an IPLNB and/or with other WLAN enabled devices. The satellite dish 1208b may be located external to the house 1202 and is powered by the second integrated wireless power and BNC module 1204b.

The picocell 1208c may comprise suitable logic, circuitry interfaces and/or code that may be operable to communicate wireless signals within a specific range. The picocell 1208c may be operable to utilize one or more wireless technologies such as 3G, 4G, 802.16, 802.11 and variants thereof. The picocell 1208c may be located external to the house 1202 and is powered by the second integrated wireless power and BNC module 1204b. The picocell 1208c may be operable to communicate wireless signals over the air and backhaul traffic over the network in the home via the second integrated wireless power and BNC module 1204b and the first integrated wireless power and BNC module 1204a.

The femtocell 1208d may comprise suitable logic, circuitry interfaces and/or code that may be operable to communicate wireless signals within a specific range, which may be greater than the range associated with the picocell 1208c. The femtocell 1208d may be operable to utilize one or more wireless technologies such as 3G, 4G, 802.16, 802.11 and variants thereof. The satellite dish 1208ad may be located external to the house 1202 and is powered by the second integrated wireless power and BNC module 1204b. The femtocell 1208d may be operable to communicate wireless signals over the air and backhaul traffic over the network in the home via the second integrated wireless power and BNC module 1204b and the first integrated wireless power and BNC module 1204ab.

Each of the plurality of external communication devices 1208, which comprises the satellite dish 1208a, the satellite dish with an IPLNB 1208b, the picocell 1208c, the femtocell 1208d, and the other outdoor communication system 1208e are located external to the home. For example, each of the plurality of external communication devices 1208, which comprises the satellite dish 1208a, the satellite dish with an IPLNB 1208b, the picocell 1208c, the femtocell 1208d, and the other outdoor communication system 1208e may be mounted on a side of the home 1202 or on a roof of the home 1202. Since these devices need power to operate, and to eliminate the need to drill a hole in the home to power these devices, various exemplary embodiments of the invention provides power to these devices via the second integrated wireless power and BNC module 1204b. In this regard, the second integrated wireless power and BNC module 1204b receives it power wirelessly from the first integrated wireless power and BNC module 1204b.

In operation, the first integrated wireless power and BNC module 1204a may be powered from an AC power sources within the home 1202. The first integrated wireless power and BNC module 1204a may be operable to wirelessly power the second integrated wireless power and BNC module 1204a. One or more of the plurality of external communication devices 1208, which are located external the home 1202 may be powered by the second integrated wireless power and BNC module 1204b. In this regard, the second integrated wireless power and BNC module 1204b may comprise a receptacle or other interface that enables the plurality of external communication devices 1208 to be plugged in or otherwise coupled to provide power to one or more of the plurality of external communication devices 1208.

Figure 13:
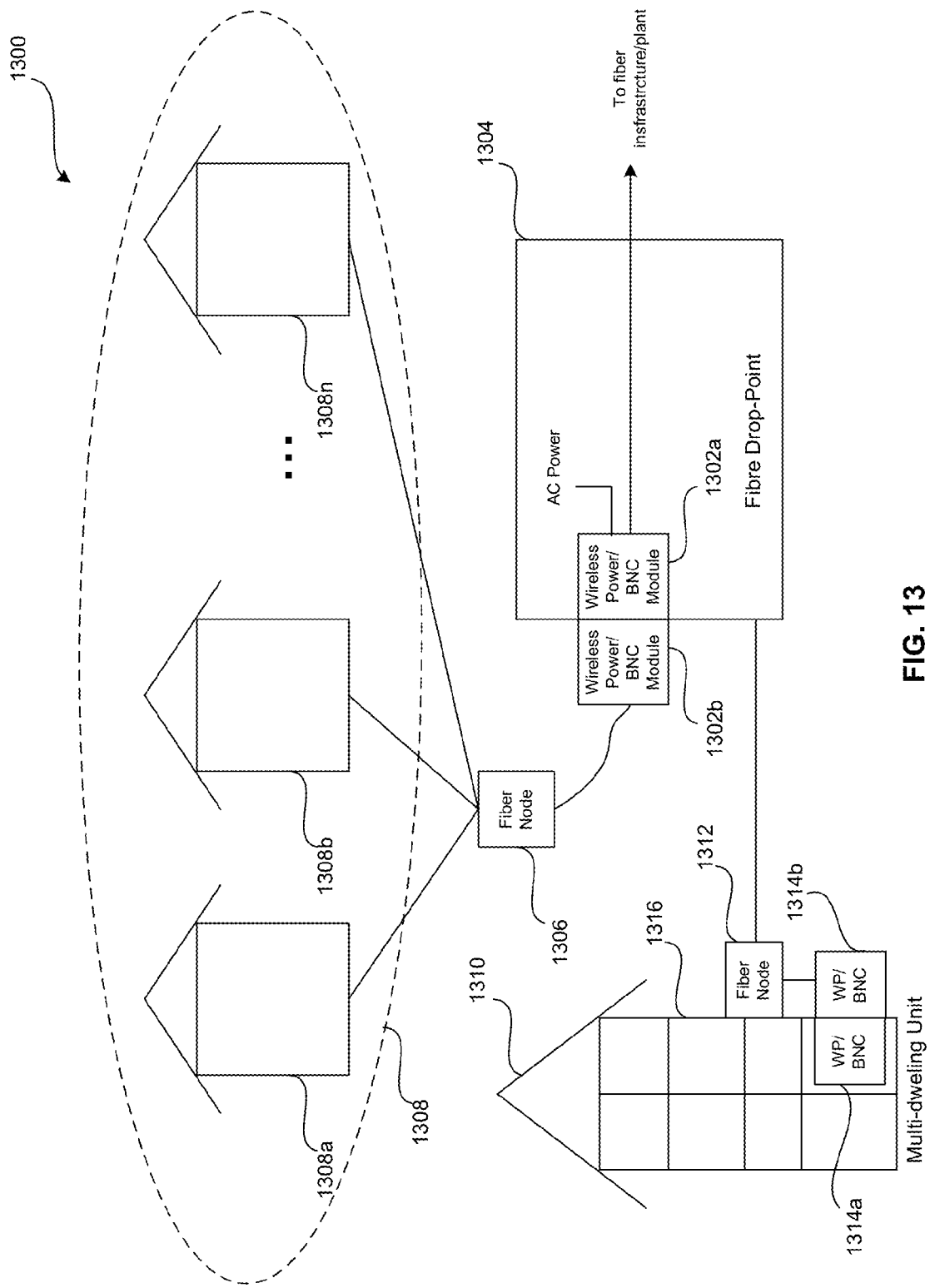
FIG. 13 is a diagram of an exemplary system that is operable to provide wireless power at the drop-point of a fibre distribution system, in accordance with an exemplary embodiment of the invention.

FIG. 13 is a diagram of an exemplary system that is operable to provide wireless power at the drop-point of a fibre distribution system, in accordance with an exemplary embodiment of the invention. Referring to FIG. 13, the system 1300 comprises a first integrated wireless power and BNC module 1302a, a second integrated wireless power and BNC module 1302b, a third integrated wireless power and BNC module 1314a, a fourth integrated wireless power and BNC module 1314b, a fibre drop-point 1304, fibre nodes 1306 and 1312, a plurality of homes 1308a, 1308b, ... 1308n, which are collectively referenced as 1308 and a multi-dwelling until 1310.

The first integrated wireless power and BNC module 1302a and the second integrated wireless power and BNC module 1302b may comprise suitable logic, circuitry, interfaces and/or code that may be operable to provide and/or receive wireless power and also provide wireless communication across the dwelling wall 1316. The first integrated wireless power and BNC module 1302*a* and the second integrated wireless power and BNC module 1302*b* may be paired and positioned on opposite sides of a wall at the fibre drop-point 1304. Each of the first integrated wireless power and BNC module 1302*a* and the second integrated wireless power and BNC module 1302*b* may be substantially similar to the first integrated wireless power and BNC module 1104 and the second integrated wireless power and BNC module 1124, which are respectively illustrated in FIG. 11A. The first integrated wireless power and BNC module 1302*a* is located within the fibre drop-point 1304, and is shown coupled to an AC power source that is located within the fibre drop-point 1304. The second integrated wireless power and BNC module 1302*b* is located external to the fibre drop-point 1304 and is wirelessly powered by the wireless power module within the first integrated wireless power and BNC module 1302*a*.

The third integrated wireless power and BNC module 1314*a* and the fourth integrated wireless power and BNC module 1314*b* may comprise suitable logic, circuitry, interfaces and/or code that may be operable to provide and/or receive wireless power and also provide wireless communication across the dwelling wall 1316. The third integrated wireless power and BNC module 1314*a* and the second integrated wireless power and BNC module 1314*b* may be paired and positioned on opposite sides of the dwelling wall 1316 at the multi-dwelling unit 1310. Each of the third integrated wireless power and BNC module 1314*a* and the fourth integrated wireless power and BNC module 1314*b* may be substantially similar to the first integrated wireless power and BNC module 1104 and the second integrated wireless power and BNC module 1124, which are respectively illustrated in FIG. 11A. The third integrated wireless power and BNC module 1314*a* is located within the multi-dwelling unit 1310, and is coupled to an AC power source (not shown) that is located within the multi-dwelling unit 1310. The fourth integrated wireless power and BNC module 1314*b* is located external to the multi-dwelling unit 1310 and is wirelessly powered by the wireless power module within the third integrated wireless power and BNC module 1314*a*.

The fibre drop-point 1304 may comprise suitable logic, circuitry, interfaces and code that may be operable to function as a distribution point in a fiber optic network. The fibre drop-point 1304 may be operable to service a plurality of fibre nodes, for example, the fibre node 1306 and the fibre node 1312. The fibre drop-point 1304 may be a building, hut, or housing, which may be similar to a telephone central office. In some instances, the fibre drop-point 1304 may even be part of an existing building such as an office or factory, where space may be rented or leased to house the equipment. The fibre drop-point may be located in close proximity to one of the homes 1308*a*, 1308*b*, . . . 1308*n*.

The fibre nodes 1306 and 1312 may comprise suitable logic, circuitry, interfaces and code that may be operable to distribute content bearing optical and/or electrical signals. For example, the fibre node 1306 may be operable to distribute optical and/or electrical signals to the homes 1308*a*, 1308*b*, . . . 1308*n*. The devices within the fibre node 1306 may be powered using power that is derived from the second integrated wireless power and BNC module 1302*b*. The fibre node 1312 may be operable to distribute optical and/or electrical signals to the multi-dwelling unit 1310. The third integrated wireless power and BNC module 1314*a* may be powered from an AC power source that is located within the multi-dwelling unit 1310. The devices within the fibre node 1312 may be powered using power that is derived from the fourth integrated wireless power and BNC module 1314*b*.

Each of the plurality of homes 1308*a*, 1308*b*, . . . 1308*n* may be coupled to and receive service via the fibre node 1306. Similarly, each of the dwelling units in the multi-dwelling unit 1310 may receive service via the fibre node 1312.

In operation, the first integrated wireless power and BNC module 1302*a* and the second integrated wireless power and BNC module 1302*b*, which are paired, may be operable to provide power and/or communication services to one or more fibre nodes such as the fibre node 1306. The third integrated wireless power and BNC module 1314*a* and the fourth integrated wireless power and BNC module 1314*b*, which are paired, may be operable to provide power and/or communication services to one or more fibre nodes such as the fibre node 1312.

In accordance with various exemplary embodiments of the invention, a communication system may comprise a first Broadband Near-Field Communication with Full Spectrum Capture (BNC/FSC) dongle 906*a* and a second BNC/FSC dongle 906*b*. Signals may be wirelessly communicated from the first BNC/FSC dongle 906*a* to the second BNC/FSC dongle 906*b*. A barrier 908 separates the first BNC/FSC dongle 906*a* from the second BNC/FSC dongle 906*b*. The first BNC/FSC dongle 906*a* may be paired with the second BNC/FSC dongle 906*b*.

The processor 271 and/or the BNC/FSC transceiver 270 may be operable to detect usable channels within a frequency spectrum band designated for use by the first BNC/FSC dongle 906*a* and the second BNC/FSC dongle 906*b*. The signals may be wirelessly communicated from the first BNC/FSC dongle 906*a* to the second BNC/FSC dongle 906*b* via one or more of the detected usable channels. Two or more of the plurality of the detected usable channels may be aggregated by the processor 271 and/or the BNC/FSC transceiver 270. The signals may be wirelessly communicated from the first BNC/FSC dongle 906*a* to the second BNC/FSC dongle 906*b* via at least a portion of the aggregated plurality of the detected usable channels. The processor 271 and/or the BNC/FSC transceiver 270 may be operable to align the first BNC/FSC dongle 906*a* with the second BNC/FSC dongle 906*b* and the first BNC/FSC dongle 906*a* and the second BNC/FSC dongle 906*b* are on opposite sides of the barrier 908. The processor 271 may be operable to generate test signals that may be utilized to enable the alignment of the first BNC/FSC dongle 906*a* with the second BNC/FSC dongle 906*b*. One or both of the first BNC/FSC dongle 906*a* and the second BNC/FSC dongle 906*b* may be operable to generate the test signals. Visual and/or audio cues may be generated by one or both of the first BNC/FSC dongle 906*a* and the second BNC/FSC dongle 906*b* to aid with the aligning. An alignment/position module in one or both of the first BNC/FSC dongle 906*a* and the second BNC/FSC dongle 906*b* may be utilized to generated the visual and/or audio cues via LEDs/LCD and a speaker respectively. In general, the processor 271 may be operable to utilize one or more signals and/or one or more signal quality indicators to enable the aligning of the first BNC/FSC dongle 906*a* with the second BNC/FSC dongle 906*b*. One or both of the first BNC/FSC dongle 906*a* and the second BNC/FSC dongle 906*b* may be operable to generate the one or more signals and/or the one or more signal quality indicators.

In some exemplary embodiments of the invention, the one or more signals may comprise signals and/or signal components such as, for example, test signals, preambles and pilot tones. The one or more signal quality indicators may comprise indicators such as, for example, error rates, signal to noise ratio, signal to interference plus noise ratio, carrier to noise ratio, carrier to interference plus noise ratio, error vector magnitude, and signal strength indicator. Exemplary error rates may comprise bit error rates and packet error rates.

In another exemplary embodiment of the invention, a communication system may comprise a first broadband wireless device and a second broadband wireless device. Signals may be wirelessly communicated from the first broadband wireless device to the second broadband wireless device at a power level that is below a spurious emissions mask. The communicated signals may be transmitted over a designated frequency band. A barrier separates the first broadband wireless device from the second broadband wireless device. The first broadband wireless device may be paired with the second broadband wireless device. Usable channels may be detected within a frequency spectrum band designated for use by the first and the second broadband wireless device. The signals may be wirelessly communicated from the first to the second broadband wireless device via one or more of the detected usable channels. Two or more of the plurality of the detected usable channels may be aggregated and the signals may be wirelessly communicated from the first to the second broadband wireless device via at least a portion of the aggregated plurality of the detected usable channels. The wireless communication of the signals may utilize at least a portion of the aggregated plurality of the detected usable channels. The signals may be wirelessly transmitted and/or received via one or more antennas that are utilized by the first broadband wireless device and the second broadband wireless device for wireless power transfer via their corresponding wireless power modules. The second broadband wireless device may be powered by an auxiliary power source when the first broadband wireless device is fully powered up and the second broadband wireless device is operating in a low power mode.

In another exemplary embodiment of the invention, the first broadband wireless device may be aligned with said second broadband wireless device when the first broadband wireless device and the second broadband wireless device are on opposite sides of said barrier. One or more signals and/or one or more signal quality indicators may be utilized to enable the aligning of the first broadband wireless device with the second broadband wireless device. One or both of the first broadband wireless device and the second broadband wireless device are operable to generate the one or more signals and/or said one or more signal quality indicators. The one or more signals may comprise test signals, preambles and pilot tones. The one or more signal quality indicators may comprises error rates, signal to noise ratio, signal to interference plus noise ratio, carrier to noise ratio, carrier to interference noise ratio, error vector magnitude, and signal strength indicator. Visual and/or audio cues may be generated by one or both of the first broadband wireless device and the second broadband wireless device to aid with the aligning.

There may be cases when one of the first broadband wireless device and the second broadband wireless device may be powered up and the other is either unpowered or does not yet possess sufficient power to allow it to operate at optimal power to provide full alignment capabilities. This may present what may be termed as a bootstrapping issue.

For example, in the case where the first broadband wireless device is sufficiently powered and the second broadband wireless device is unpowered, an auxiliary power source such as a battery, an adapter or other type of power supply power source may be utilized to power up the second broadband device. Once the second broadband wireless device is powered up, the alignment procedure for may occur at full power and the second broadband wireless device may be optimally aligned with the first broadband wireless device.

In another example, in the case where the first broadband wireless device is sufficiently powered and the second broadband wireless device does not yet possess sufficient power to allow it to operate at optimal power, then the second broadband wireless device may be operable to utilize its low power state to do, for example, a course or rough alignment so that it may be placed or located within proximity of the first broadband wireless device. Once the second broadband wireless device is coarse aligned with the first broadband wireless device, the second broadband wireless device will be operable received additional power from the first broadband wireless device. This additional power may enable the second broadband wireless device to be optimally aligned with the first broadband wireless device.

In accordance with an exemplary embodiment of the invention, one or both of the first broadband wireless device and the second broadband wireless device may comprise suitable logic, circuitry interfaces, and/or code be enabled to operate in a low power mode. One or both of the first broadband wireless device may be operable to receive power via an auxiliary power source such as a battery or an AC adapter. In this regard, the battery may be an external battery, which is located outside the one or both of the first broadband wireless device and the second broadband wireless device, and/or the battery may be internal to the one or both of the first broadband wireless device and the second broadband wireless device. The one or both of the first broadband wireless device and the second broadband wireless device may be operable to automatically detect when there is low power and accordingly switch to the auxiliary power source. Once power is being provided at a normal operating level, the auxiliary power source may be decoupled. A manual switching mechanism may also be provided to enable coupling to and decoupling from the auxiliary power source.

Although this disclosure makes various references to BNC and near-field communications in general, in some implementations communications described above as using near-field communications may also or alternatively use transition zone (distances between near field and far field) communications and/or far-field communications. Accordingly, aspects of the present invention, including various devices, protocols, and systems described herein using "BNC" or "near-field" modifiers, should be considered as disclosing corresponding transition zone and fair-field devices, protocols, and systems. Therefore, a claim term should not be construed as being necessarily limited by the terms "BNC" or "near-field" unless such modifiers are explicitly recited in the claim with respect to such claim term.

Another exemplary embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for broadband near-field communication (BNC) Utilizing full spectrum capture (FSC) supporting bridging across wall.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain exemplary embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
in a first broadband wireless device comprising a full spectrum capture receiver:
concurrently capturing and digitizing a plurality of channels spanning a first frequency band and a second frequency band, wherein said first frequency band is allocated, by a regulatory body, for signals of a first type and said second frequency band is allocated, by said regulatory body, for signals of a second type, wherein said signals of said first type adhere to a first one or more standards for far-field communications and said signals of said second type adhere to a second one or more standards for far-field communications;
selecting a subset of said plurality of channels which have electromagnetic energy below a determined threshold, wherein at least one of the subset of channels is in each of said first frequency band and said second frequency band; and
transmitting a near-field communication signal on said selected subset of said plurality of channels, wherein, on each one of said channels in said selected subset, a transmit power level at which said near-field communication signal is transmitted is below a spurious emissions mask set for said one of said channels by said regulatory body.

2. The method according to claim 1, comprising transmitting said near-field communication signal during pairing said first broadband wireless device with a second broadband wireless device.

3. The method according to claim 2, wherein said second broadband wireless device is powered by an auxiliary power source when said first broadband wireless device is fully powered up and said second broadband wireless device is operating in a low power mode.

4. The method according to claim 1, comprising wirelessly transmitting said near-field communication signal via one or more antennas utilized by said first broadband wireless device for wireless power transfer.

5. The method according to claim 1, comprising transmitting said near-field communication signal for aligning said first broadband wireless device with a second broadband wireless device, wherein said first broadband wireless device and said second broadband wireless device are on opposite sides of a barrier.

6. The method according to claim 5, comprising utilizing, by said first broadband wireless device, one or more signal quality indicators for said near-field communication signal to enable said aligning of said first broadband wireless device with said second broadband wireless device.

7. The method according to claim 6, wherein:
said near-field communication signal comprises a preambles and pilot tones; and
said one or more signal quality indicators comprises error rates, signal to noise ratio, signal to interference plus noise ratio, carrier to noise ratio, carrier to interference noise ratio, error vector magnitude, and/or signal strength indicator.

8. The method according to claim 5, comprising generating, by said first broadband wireless device, visual and/or audio cues to aid with said aligning.

9. The method according to claim 1, comprising entering a low power state during a period of poor device alignment and entering a full power state when device alignment reaches an improved level.

10. The method according to claim 9, comprising utilizing an auxiliary power source for the low power state.

11. The method according to claim 1, wherein:
said first one or more standards for far-field communications is different than said second one or more standards for far-field communications; and
each of first one or more standards for far-field communications and said second one or more standards for far-field communications comprises one of: IEEE 802.11, Bluetooth, Zigbee, WiMax, and broadcast television.

12. A system for communication, the system comprising:
one or more circuits for use in a first broadband wireless device, said one or more circuits comprising a full spectrum receiver and being operable to:
concurrently capture and digitize a plurality of channels spanning a first frequency band and a second frequency band, wherein said first frequency band is allocated, by a regulatory body, for signals of a first type and said second frequency band is allocated, by said regulatory body, for signals of a second type, wherein said signals of said first type adhere to a first one or more standards for far-field communications and said signals of said second type adhere to a second one or more standards for far-field communications;
select a subset of said plurality of channels which have electromagnetic energy below a determined threshold, wherein at least one of the subset of channels is in each of said first frequency band and said second frequency band; and
transmit a near-field communication signal on said selected subset of said plurality of channels, wherein, on each one of said channels in said selected subset, a transmit power level at which said near-field communication signal is transmitted is below a spurious emissions mask set for said one of said channels by said regulatory body.

13. The system according to claim 12, wherein said one or more circuits are operable to transmit said near-field communication signal during pairing of said first broadband wireless device with a second broadband wireless device.

14. The system according to claim 13, wherein said second broadband wireless device is powered by an auxiliary power source when said first broadband wireless device is fully powered up and said second broadband wireless device is operating in a low power mode.

15. The system according to claim 12, wherein said one or more circuits are operable to wirelessly transmit said near-field communication signal via one or more antennas utilized by said first broadband wireless device for wireless power transfer.

16. The system according to claim 12, wherein:
said one or more circuits are operable to transmit said near-field communication signal for aligning of said first broadband wireless device with a second broadband wireless device; and
said first broadband wireless device and said second broadband wireless device are on opposite sides of a barrier.

17. The system according to claim 16, wherein said one or more circuits are operable to utilize one or more signals and/or one or more signal quality indicators to enable said alignment of said first broadband wireless device with said second broadband wireless device.

18. The system according to claim 17, wherein:
said near-field communication signal comprises a preambles and pilot tones; and
said one or more signal quality indicators comprises error rates, signal to noise ratio, signal to interference plus noise ratio, carrier to noise ratio, carrier to interference noise ratio, error vector magnitude, and/or signal strength indicator.

19. The system according to claim 16, wherein said one or more circuits are operable to generate visual and/or audio cues to aid with said alignment.

20. The system according to claim 12, wherein said one or more circuits comprises a first wireless power module integrated with said first broadband wireless device are operable to wirelessly communicate power signals from said first broadband wireless device to a second broadband wireless device.

21. The system according to claim 12, wherein said one or more circuits are operable to enter a low power state during a period of poor device alignment and enter a full power state when device alignment reaches an improved level.

22. The system according to claim 21, wherein said one or more circuits utilize an auxiliary power source for the low power state.

23. The system according to claim 12, wherein:
said first one or more standards for far-field communications is different than said second one or more standards for far-field communications; and
each of first one or more standards for far-field communications and said second one or more standards for far-field communications comprises one of: IEEE 802.11, Bluetooth, Zigbee, WiMax, and broadcast television.

* * * * *